US012710351B2

(12) United States Patent
Wang et al.

(10) Patent No.: US 12,710,351 B2
(45) Date of Patent: Aug. 18, 2026

(54) LIGHT DETECTING SYSTEM AND LIGHT DETECTING METHOD FOR FLOW CYTOMETER

(71) Applicants: Beckman Coulter Biotechnology (Suzhou) Co., Ltd., Jiangsu (CN); Beckman Coulter, Inc., Brea, CA (US)

(72) Inventors: Jianhua Wang, Suzhou (CN); Xianghua Shi, Suzhou (CN); Evgenia M Kim, Palmetto Bay, FL (US); Xi Liu, Suzhou (CN); Xiao Lv, Suzhou (CN)

(73) Assignees: Beckman Coulter Biotechnology (Suzhou) Co., Ltd., Suzhou (CN); Beckman Coulter, Inc., Brea, CA (US)

(*) Notice: Subject to any disclaimer, the term of this patent is extended or adjusted under 35 U.S.C. 154(b) by 152 days.

(21) Appl. No.: 18/847,394

(22) PCT Filed: Feb. 1, 2023

(86) PCT No.: PCT/CN2023/074110

§ 371 (c)(1),
(2) Date: Sep. 16, 2024

(87) PCT Pub. No.: WO2023/179206

PCT Pub. Date: Sep. 28, 2023

(65) Prior Publication Data

US 2025/0198904 A1 Jun. 19, 2025

(30) Foreign Application Priority Data

Mar. 23, 2022 (CN) ......................... 202210288648.8

(51) Int. Cl.
*G01N 15/1434* (2024.01)
*G01N 15/10* (2006.01)

(52) U.S. Cl.
CPC . *G01N 15/1434* (2013.01); *G01N 2015/1006* (2013.01)

(58) Field of Classification Search
CPC ....... G01N 15/1434; G01N 2015/1006; G01N 15/1459; G01N 2015/1477;
(Continued)

(56) References Cited

U.S. PATENT DOCUMENTS

| | | | |
|---|---|---|---|
| 315,667 | A | 4/1885 | Serdinko |
| 2,385,495 | A | 9/1945 | Brian |

(Continued)

FOREIGN PATENT DOCUMENTS

| | | | |
|---|---|---|---|
| CN | 1199177 | A | 11/1998 |
| CN | 102087198 | A | 6/2011 |

(Continued)

OTHER PUBLICATIONS

Akiyama et al., "Multiple-Beam Optically Controlled Beamformer Using Spatial-and-Wavelength Division Multiplexing", 2009 International Topical Meeting on Microwave Photonics (2009, pp. 1-4) (Year: 2009).*

(Continued)

*Primary Examiner* — Kiho Kim
(74) *Attorney, Agent, or Firm* — Merchant & Gould P.C.

(57) ABSTRACT

A light detecting system and a light detecting method for a flow cytometer are provided. The light detecting system includes a beam separating device and multiple wavelength division multiplexing devices. The beam separating device is configured to separate a beam to be processed by the flow cytometer into multiple first beams having respective wavelength ranges that either do not overlap with each other or partially overlap with each other. Each of the multiple wavelength division multiplexing devices is configured to receive a respective one of the multiple first beams. The
(Continued)

multiple first beams are parallel to each other when received by the multiple wavelength division multiplexing devices. Each of the multiple wavelength division multiplexing devices includes multiple light detecting devices being configured to detect a portion of the respective first beam.

15 Claims, 15 Drawing Sheets

(58) Field of Classification Search
CPC ... G01N 2015/1493; G01N 2015/1497; G01N 15/1429; G01J 3/0205; G01J 3/0208; G01J 3/021; G01J 3/36; G02B 27/1006
See application file for complete search history.

(56) References Cited

U.S. PATENT DOCUMENTS 2,669,709 A 2/1954 Glancy et al.
2,764,147 A 9/1956 Brunner
3,199,341 A 8/1965 Heuer, Jr. et al.
3,411,293 A 11/1968 Akins
3,542,491 A 11/1970 Newman
3,661,460 A 5/1972 Elking et al.
3,726,613 A 4/1973 von Casimir
3,826,593 A 7/1974 Von Casimir
3,873,204 A 3/1975 Friedman et al.
3,946,239 A 3/1976 Salzman et al.
3,953,727 A 4/1976 D'Auria et al.
3,989,381 A 11/1976 Fulwyler
4,073,574 A 2/1978 Clarke et al.
4,188,543 A 2/1980 Brunsting et al.
4,189,236 A 2/1980 Hogg et al.
4,244,045 A 1/1981 Nosu et al.
4,385,234 A 5/1983 Johnson
4,482,994 A 11/1984 Ishikawa
4,515,274 A 5/1985 Hollinger et al.
4,564,342 A 1/1986 Weber et al.
4,576,556 A 3/1986 Thompson
4,623,225 A 11/1986 Forkner
4,673,289 A 6/1987 Gaucher
4,727,020 A 2/1988 Recktenwald
4,745,285 A 5/1988 Recktenwald et al.
4,778,253 A 10/1988 Siga et al.
4,834,630 A 5/1989 Godwin
4,871,249 A 10/1989 Watson
4,920,275 A 4/1990 Itoh
4,950,136 A 8/1990 Haas et al.
4,976,590 A 12/1990 Baldwin
4,997,275 A 3/1991 Gaucher et al.
5,050,963 A 9/1991 Murakami
5,142,462 A 8/1992 Kashima
5,157,917 A 10/1992 Liang et al.
5,177,641 A 1/1993 Kobayashi et al.
5,230,614 A 7/1993 Zanger et al.
5,245,318 A 9/1993 Tohge et al.
5,251,060 A 10/1993 Uenishi et al.
5,257,917 A 11/1993 Minarik et al.
5,299,066 A 3/1994 Rombult
5,317,162 A 5/1994 Pinsky et al.
5,369,476 A 11/1994 Bowers et al.
5,373,395 A 12/1994 Adachi
5,396,487 A 3/1995 Abe et al.
5,467,225 A 11/1995 Manabe
5,470,211 A 11/1995 Knott et al.
5,475,210 A 12/1995 Taguchi et al.
5,540,494 A 7/1996 Purvis, Jr. et al.
5,548,395 A 8/1996 Kosaka
5,583,683 A 12/1996 Scobey
5,615,200 A 3/1997 Hoshino et al.
5,746,585 A 5/1998 McDunn et al.
5,748,372 A 5/1998 Kitagawa
5,777,674 A 7/1998 Ohmuro
5,781,351 A 7/1998 Murakami et al.
5,786,915 A 7/1998 Scobey
5,788,927 A 8/1998 Farrell et al.
5,805,363 A 9/1998 Okuda et al.
5,850,292 A 12/1998 Braun
5,872,627 A 2/1999 Miers
5,915,925 A 6/1999 North, Jr.
5,971,713 A 10/1999 North, Jr.
6,008,920 A 12/1999 Hendrix
6,017,194 A 1/2000 North, Jr.
6,102,678 A 8/2000 Peclat
6,135,734 A 10/2000 Isozumi et al.
6,159,686 A 12/2000 Kardos et al.
6,198,864 B1 3/2001 Lemoff et al.
6,200,101 B1 3/2001 North, Jr.
6,252,719 B1 6/2001 Eichenbaum
6,315,952 B1 11/2001 Sklar et al.
6,510,007 B1 1/2003 Blasenheim
6,542,306 B2 4/2003 Goodman
6,572,255 B2 6/2003 Husher
6,592,822 B1 7/2003 Chandler
6,608,682 B2 8/2003 Ortyn et al.
6,618,143 B2 9/2003 Roche et al.
6,638,481 B2 10/2003 Sklar et al.
6,647,175 B1 11/2003 Loregio et al.
6,683,314 B2 1/2004 Oostman, Jr. et al.
6,713,019 B2 3/2004 Ozasa et al.
6,748,133 B2 6/2004 Liu et al.
6,767,188 B2 7/2004 Vrane et al.
6,768,593 B1 7/2004 Jutamulia
6,788,409 B2 9/2004 Goodwin
6,794,671 B2 9/2004 Nicoli et al.
6,813,017 B1 11/2004 Hoffman et al.
6,839,367 B2 1/2005 Nagamatsu et al.
6,870,679 B2 3/2005 Randall et al.
6,870,976 B2 3/2005 Chen et al.
6,897,954 B2 5/2005 Bishop et al.
6,941,047 B2 9/2005 Capewell et al.
6,954,722 B2 10/2005 Parks et al.
6,975,400 B2 12/2005 Ortyn et al.
7,038,778 B2 5/2006 Yamauchi
7,072,540 B1 7/2006 Szapiel et al.
7,110,192 B2 9/2006 Sauter et al.
7,113,266 B1 9/2006 Wells
7,127,356 B2 10/2006 Nicoli et al.
7,129,505 B2 10/2006 Oostman, Jr. et al.
7,212,343 B1 5/2007 He et al.
7,260,328 B2 8/2007 Kropp
7,262,838 B2 8/2007 Fritz
7,268,953 B2 9/2007 Matthae et al.
7,305,018 B2 12/2007 Otoma
7,381,565 B2 6/2008 Kurabayashi et al.
7,385,682 B2 6/2008 Chu et al.
7,430,048 B2 9/2008 Reel et al.
7,450,229 B2 11/2008 Ortyn et al.
7,453,915 B2 11/2008 Imai
7,456,960 B2 11/2008 Cerni et al.
7,496,463 B2 2/2009 Nicoli et al.
7,505,131 B2 3/2009 Roth
7,507,588 B2 3/2009 Mehrpouyan et al.
7,561,267 B2 7/2009 Luo et al.
7,580,120 B2 8/2009 Hamada et al.
7,623,243 B2 11/2009 Kato
7,630,147 B1 12/2009 Kar et al.
7,645,127 B2 1/2010 Hagen et al.
7,668,422 B2 2/2010 Kropp
7,758,324 B2 7/2010 Baumann et al.
7,768,120 B2 8/2010 Takashima
7,781,227 B2 8/2010 Mehrpouyan et al.
7,787,197 B2 8/2010 Chen
7,835,000 B2 11/2010 Graves et al.
7,876,436 B2 1/2011 Chu
7,889,263 B2 2/2011 Ortyn et al.
7,894,047 B2 2/2011 Hamada et al.
7,952,981 B2 5/2011 Suzuki
7,981,661 B2 7/2011 Rich
8,009,189 B2 8/2011 Ortyn et al.
8,049,185 B2 11/2011 Hayashi et al.
8,149,525 B2 4/2012 Do
8,157,547 B2 4/2012 Hendrikus Oude Vrielink
8,187,888 B2 5/2012 Rich

(56) References Cited

U.S. PATENT DOCUMENTS

| | | | |
|---|---|---|---|
| 8,213,472 | B2 | 7/2012 | Hirai et al. |
| 8,229,707 | B2 | 7/2012 | Olson et al. |
| 8,233,146 | B2 | 7/2012 | Chen |
| 8,253,938 | B2 | 8/2012 | Vacca et al. |
| 8,270,098 | B2 | 9/2012 | Fukuta et al. |
| 8,284,402 | B2 | 10/2012 | Frazier et al. |
| 8,337,096 | B2 | 12/2012 | Shen et al. |
| 8,345,237 | B2 | 1/2013 | Tsukii et al. |
| 8,405,048 | B2 | 3/2013 | Hayashi |
| 8,432,541 | B2 | 4/2013 | Rich |
| 8,436,371 | B2 | 5/2013 | Medendorp, Jr. et al. |
| 8,436,993 | B2 | 5/2013 | Kaduchak et al. |
| 8,488,244 | B1 | 7/2013 | Li et al. |
| 8,507,279 | B2 | 8/2013 | Ball et al. |
| 8,928,881 | B2 | 1/2015 | Swalwell |
| 9,746,412 | B2 | 8/2017 | Chen |
| 10,261,080 | B2 | 4/2019 | Li et al. |
| 11,169,076 | B2 | 11/2021 | Yan et al. |
| 11,255,772 | B2 | 2/2022 | Chen |
| 11,333,597 | B2 | 5/2022 | Yan et al. |
| 11,821,830 | B2 | 11/2023 | Ilkov |
| 2002/0067895 | A1 | 6/2002 | Flanders |
| 2002/0081744 | A1 | 6/2002 | Chan et al. |
| 2002/0131180 | A1 | 9/2002 | Goodman |
| 2002/0141902 | A1 | 10/2002 | Ozasa et al. |
| 2003/0044967 | A1 | 3/2003 | Heffelfinger et al. |
| 2003/0048539 | A1 | 3/2003 | Oostman, Jr. et al. |
| 2003/0142720 | A1 | 7/2003 | Bradburn et al. |
| 2004/0031521 | A1 | 2/2004 | Vrane et al. |
| 2004/0033010 | A1 | 2/2004 | McGuire, Jr. |
| 2004/0101247 | A1 | 5/2004 | Chen et al. |
| 2004/0165828 | A1 | 8/2004 | Capewell et al. |
| 2004/0218184 | A1 | 11/2004 | Jorgenson et al. |
| 2005/0002425 | A1 | 1/2005 | Govorkov et al. |
| 2005/0084402 | A1 | 4/2005 | Vanek |
| 2005/0134836 | A1 | 6/2005 | Paldus et al. |
| 2005/0274890 | A1 | 12/2005 | Anderton et al. |
| 2006/0221325 | A1 | 10/2006 | Wells |
| 2006/0245964 | A1 | 11/2006 | Koslov |
| 2006/0256333 | A1 | 11/2006 | Bloom et al. |
| 2006/0256335 | A1 | 11/2006 | Chen |
| 2006/0292021 | A1 | 12/2006 | Tu |
| 2007/0124947 | A1 | 6/2007 | Munroe et al. |
| 2007/0195310 | A1 | 8/2007 | Kanda |
| 2007/0212784 | A1 | 9/2007 | Okun |
| 2007/0296744 | A1 | 12/2007 | Kubota et al. |
| 2008/0010019 | A1 | 1/2008 | Thomas |
| 2008/0024758 | A1 | 1/2008 | Tabata |
| 2008/0241911 | A1 | 10/2008 | Ueno et al. |
| 2009/0091746 | A1 | 4/2009 | Fukuda et al. |
| 2009/0131859 | A1 | 5/2009 | Delcastillo et al. |
| 2009/0174881 | A1 | 7/2009 | Rich |
| 2009/0190128 | A1 | 7/2009 | Cerni et al. |
| 2009/0310122 | A1 | 12/2009 | Hamada et al. |
| 2010/0067079 | A1 | 3/2010 | Rathjen |
| 2010/0165341 | A1 | 7/2010 | Babico et al. |
| 2010/0188559 | A1 | 7/2010 | Ortyn et al. |
| 2011/0014075 | A1 | 1/2011 | Reif et al. |
| 2011/0032522 | A1 | 2/2011 | Graves et al. |
| 2011/0089328 | A1 | 4/2011 | Li |
| 2011/0216401 | A1 | 9/2011 | Curry |
| 2012/0019825 | A1 | 1/2012 | Thomas |
| 2012/0156074 | A1 | 6/2012 | Kusch et al. |
| 2012/0211679 | A1 | 8/2012 | Heng et al. |
| 2012/0274925 | A1 | 11/2012 | Chen et al. |
| 2012/0281204 | A1 | 11/2012 | Hoshishima et al. |
| 2012/0282126 | A1 | 11/2012 | Brandt et al. |
| 2012/0287419 | A1 | 11/2012 | Sharpe et al. |
| 2013/0010181 | A1 | 1/2013 | Baba |
| 2013/0020498 | A1 | 1/2013 | Ebi et al. |
| 2013/0050782 | A1 | 2/2013 | Heng et al. |
| 2013/0070243 | A1 | 3/2013 | Goehde |
| 2013/0094102 | A1 | 4/2013 | Baba |
| 2013/0204538 | A1 | 8/2013 | Rich |
| 2013/0214176 | A1 | 8/2013 | Graves et al. |
| 2013/0308122 | A1 | 11/2013 | Merchez et al. |
| 2016/0091484 | A1 | 3/2016 | Yamada |
| 2018/0024040 | A1 | 1/2018 | Yan et al. |
| 2018/0299367 | A1 | 10/2018 | Yan et al. |
| 2021/0262917 | A1 | 8/2021 | Yan et al. |
| 2022/0113241 | A1 | 4/2022 | Chen |

FOREIGN PATENT DOCUMENTS

| | | | |
|---|---|---|---|
| CN | 201917509 | U | 8/2011 |
| CN | 201936066 | U | 8/2011 |
| CN | 201984209 | U | 9/2011 |
| CN | 102282453 | A | 12/2011 |
| CN | 102449525 | A | 5/2012 |
| CN | 102818794 | A | 12/2012 |
| CN | 102818795 | A | 12/2012 |
| CN | 102818796 | A | 12/2012 |
| CN | 113899677 | A | 1/2022 |
| EP | 459764 | A2 | 12/1991 |
| EP | 757346 | A1 | 2/1997 |
| EP | 758755 | A2 | 2/1997 |
| EP | 0889319 | A1 | 1/1999 |
| EP | 1004907 | A2 | 5/2000 |
| EP | 1953526 | A2 | 8/2008 |
| EP | 2381475 | A2 | 10/2011 |
| JP | S-55-144226 | A | 11/1980 |
| JP | S-57-116215 | A | 7/1982 |
| JP | S-61-184427 | A | 8/1986 |
| JP | H-03-197641 | A | 8/1991 |
| JP | H-04-184241 | A | 7/1992 |
| JP | H-05-119035 | A | 5/1993 |
| JP | H-05333245 | A | 12/1993 |
| JP | H-0829726 | A | 2/1996 |
| JP | H-09-502794 | A | 3/1997 |
| JP | H-10-73528 | A | 3/1998 |
| JP | 2003-505707 | A | 2/2003 |
| JP | 2004-500572 | A | 1/2004 |
| JP | 2004-341204 | A | 12/2004 |
| JP | 2005-017683 | A | 1/2005 |
| JP | 2005-315799 | A | 11/2005 |
| JP | 2008-534960 | A | 8/2008 |
| JP | 2010-085194 | A | 4/2010 |
| JP | 2010-286381 | A | 12/2010 |
| JP | 2012-026837 | A | 2/2012 |
| WO | WO-9307471 | A1 | 4/1993 |
| WO | WO-9316368 | A1 | 8/1993 |
| WO | WO-9429695 | A1 | 12/1994 |
| WO | WO-9714066 | A2 | 4/1997 |
| WO | WO-0057173 | A1 | 9/2000 |
| WO | WO-0108081 | A1 | 2/2001 |
| WO | WO-0127590 | A2 | 4/2001 |
| WO | WO-0140764 | A2 | 6/2001 |
| WO | WO-03012403 | A1 | 2/2003 |
| WO | WO-2005033654 | A2 | 4/2005 |
| WO | WO-2006013316 | A1 | 2/2006 |
| WO | WO-2009095358 | A1 | 8/2009 |
| WO | WO-2009098867 | A1 | 8/2009 |
| WO | WO-2011026942 | A2 | 3/2011 |
| WO | WO-2012056217 | A1 | 5/2012 |
| WO | WO-2012177367 | A2 | 12/2012 |
| WO | WO-2013013229 | A1 | 1/2013 |
| WO | WO-2013093035 | A1 | 6/2013 |
| WO | WO-2013181453 | A2 | 12/2013 |

OTHER PUBLICATIONS

Brogioli et al., "Heterodyne near-field scattering, " Applied Physics Letters 81(22) :4109-4111, 2002.

English translation of Office Communication issued in Japanese Patent Application No. 2022-090719, dated Aug. 10, 2023.

Extended European Search Report for EP 13796734.5, mailed Mar. 18, 2016.

Extended European Search Report issued by the European Patent Office in corresponding European Application No. 24151670.7 dated Apr. 9, 2024.

Goda et al., "Serial time-encoded amplified imaging for observation of fast dynamic phenomena," Nature 458:1145-1149. 2009.

(56) References Cited

OTHER PUBLICATIONS

International Search Report and Written Opinion for PCT/US2013/043453 mailed Dec. 20, 2013.
International Search Report and Written Opinion for PCT/US2014/067682 mailed Apr. 9, 2015.
International Search Report and Written Opinion for PCT/CN2023/074110 mailed Jun. 5, 2023.
Office Communication issued in U.S. Appl. No. 17/980,669, dated Mar. 27, 2023.
Schmidt, B., "Ein lichtstarkes komafreies Spiegelsystem," Mitteilungen der Haburger Sternwarte in Bergedorf 7(36) :15-17, 1932.
Shapiro, H. M. (2003). Practical Flow Cytometry Fourth Edition. John Wiley & Sons.
Smiley, C. H., "The Schmidt Camera," Popular Astronomy 44 :415-421, 1936.

* cited by examiner

LIGHT DETECTING SYSTEM AND LIGHT DETECTING METHOD FOR FLOW CYTOMETER

This application is a U.S. National Stage Application of PCT International patent application no. PCT/CN2023/074110, filed on Feb. 1, 2023, which claims the benefit of and priority to Chinese patent application no. 202210288648.8, filed Mar. 23, 2022, the disclosures of which are incorporated by reference herein in their entireties. To the extent appropriate, a claim of priority is made to each of the above-disclosed applications.

FIELD

The present disclosure relates to a light detecting system and a light detecting method for a flow cytometer.

BACKGROUND

Light detecting technology is applied to many fields. For example, the light detecting technology is applied to detect a volume, morphology, a property, and the like of an object. For example, the light detecting technology may be used in a flow cytometry to detect, for example, a volume, morphology, a property and the like of a micro-particle.

SUMMARY

A brief overview of the present disclosure is given below to provide a basic understanding of certain aspects of the present disclosure. However, it should be understood that the overview is not an exhaustive overview of the present disclosure. The overview is not intended to determine key or important parts of the present disclosure, nor intended to limit the scope of the present disclosure. The purpose is only to give some concepts about the present disclosure in a simplified form as a prelude to a more detailed description given later.

According to an aspect of the present disclosure, a light detecting system for a flow cytometer is provided. The light detecting system includes a beam separating device and multiple wavelength division multiplexing devices. The beam separating device is configured to separate a beam to be processed by the flow cytometer into multiple first beams having respective wavelength ranges that either do not overlap with each other or partially overlap with each other. Each of the multiple wavelength division multiplexing devices is configured to receive a respective one of the multiple first beams. The multiple first beams are parallel to each other when received by the multiple wavelength division multiplexing devices. Each of the multiple wavelength division multiplexing devices includes multiple light detecting devices being configured to detect a portion of the respective first beam.

According to another aspect of the present disclosure, a light detecting method for a flow cytometer is provided. The light detecting method includes: separating, by a beam separating device, a beam to be processed by the flow cytometer into multiple first beams having respective wavelength ranges that either do not overlap with each other or partially overlap with each other; and multiplexing and detecting the plurality of first beams by multiple wavelength division multiplexing devices, respectively. Each wavelength division multiplexing device includes multiple light detecting devices configured to detect a respective one of the multiple first beams, and the multiple first beams are parallel to each other when received by the wavelength division multiplexing devices.

According to other aspects of the present disclosure, computer program codes and a computer program product for implementing the method according to the present disclosure, and a computer-readable storage medium on which the computer program code for implementing the method according to the present disclosure is recorded are further provided.

Other aspects of embodiments of the present disclosure are given in the following specification. Preferred embodiments for fully disclosing the present disclosure are described in detail without limitation.

BRIEF DESCRIPTION OF THE DRAWINGS

The present disclosure may be better understood by referring to the detailed descriptions given below in conjunction with the drawings. Same or similar reference numerals are used to represent the same or similar components in the drawings. The drawings, together with the following detail descriptions, are included in the specification and form a part of the specification, to further exemplify preferred embodiments of the present disclosure and to explain principles and advantages of the present disclosure. In the drawings.

DETAILED DESCRIPTION OF EMBODIMENTS

Figure 1:
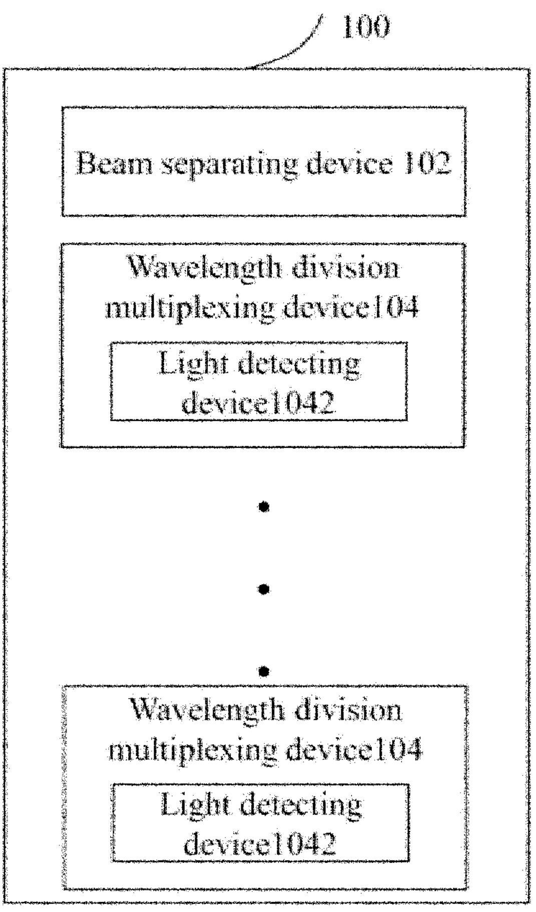
FIG. 1 is a block diagram of a configuration example of a light detecting system for a flow cytometer according to an embodiment of the present disclosure.

Exemplary embodiments of the present disclosure are described below in conjunction with the drawings. For conciseness and clarity, not all features of an actual embodiment are described in this specification. However, it should be understood that numerous embodiment-specific decisions, for example, in accord with constraining conditions related to system and business, should be made when developing any of such actual embodiments, so as to achieve specific targets of a developer. These constraining conditions may vary with different embodiments. Furthermore, it should be understood that although development work may be complicated and time-consuming, such development work is only a routine task for those skilled in the art benefiting from the present disclosure.

It should be understood that although terms "first", "second", and the like may be used for describing various elements herein, these elements should not be limited by these terms. These terms are used only for distinguishing one element from another. For example, the first element may be referred to as the second element, and similarly, the second element may be referred to as the first element, without departing from the scope of the present disclosure.

In addition, in the specification and the drawings, there are also cases where multiple components with basically the same functional configuration are distinguished by adding different letters after a same reference numeral. For example, a wavelength division multiplexing unit 1046 may be referred to as a wavelength division multiplexing unit 1046*a*, a wavelength division multiplexing unit 1046*b*, and a wavelength division multiplexing unit 1046*c* as needs. However, in a case where it is unnecessary to particularly distinguish multiple components having basically the same functional configuration from each other, only the same reference numeral is required to present the components. For example, in a case that it is unnecessary to distinguish the wavelength division multiplexing unit 1046*a*, the wavelength division multiplexing unit 1046*b* and the wavelength division multiplexing unit 1046*c* from each other, the wavelength division multiplexing unit 1046*a*, the wavelength division multiplexing unit 1046*b* and the wavelength division multiplexing unit 1046*c* are simply referred to as the wavelength division multiplexing unit 1046.

Here, it should also be noted that, in order to avoid blurring the present disclosure due to unnecessary details, only device structures and/or processing steps closely related to the solution according to the present disclosure are shown in the drawings, and other details not closely related to the present disclosure are omitted.

The embodiments according to the present disclosure are described in detail below in conjunction with the drawings.

Figure 2:
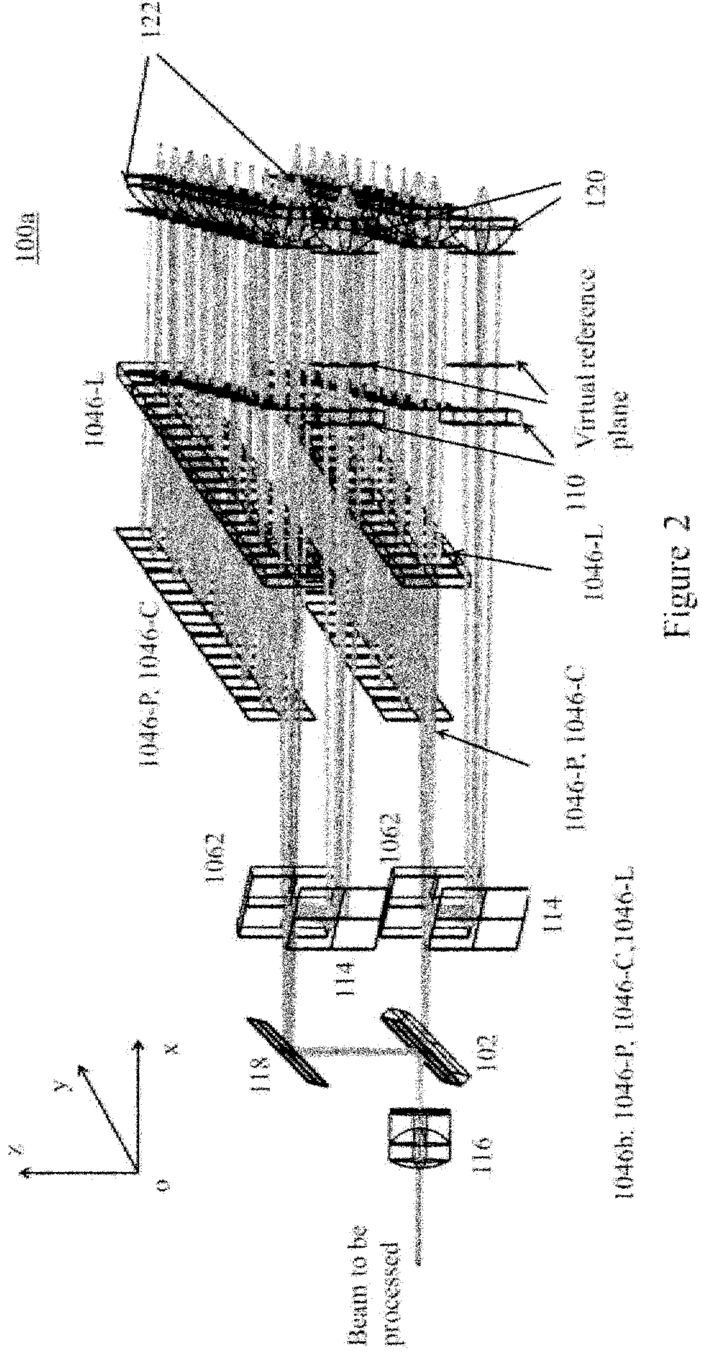
FIG. 2 is a 3D layout showing an implementation of a light detecting system for a flow cytometer according to an embodiment of the present disclosure.
Figure 3:
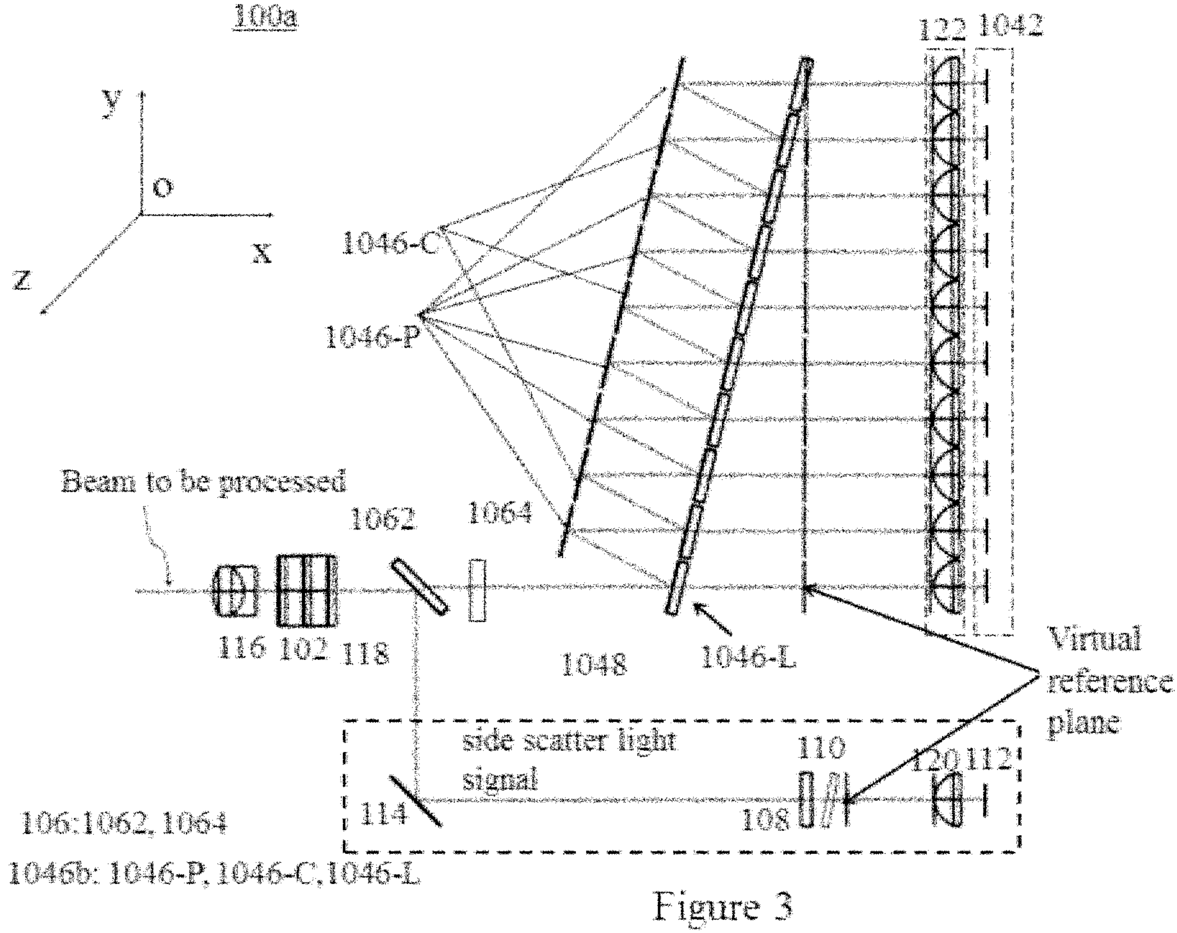
FIG. 3 is a top view showing an implementation of a light detecting system for a flow cytometer according to an embodiment of the present disclosure.
Figure 4:
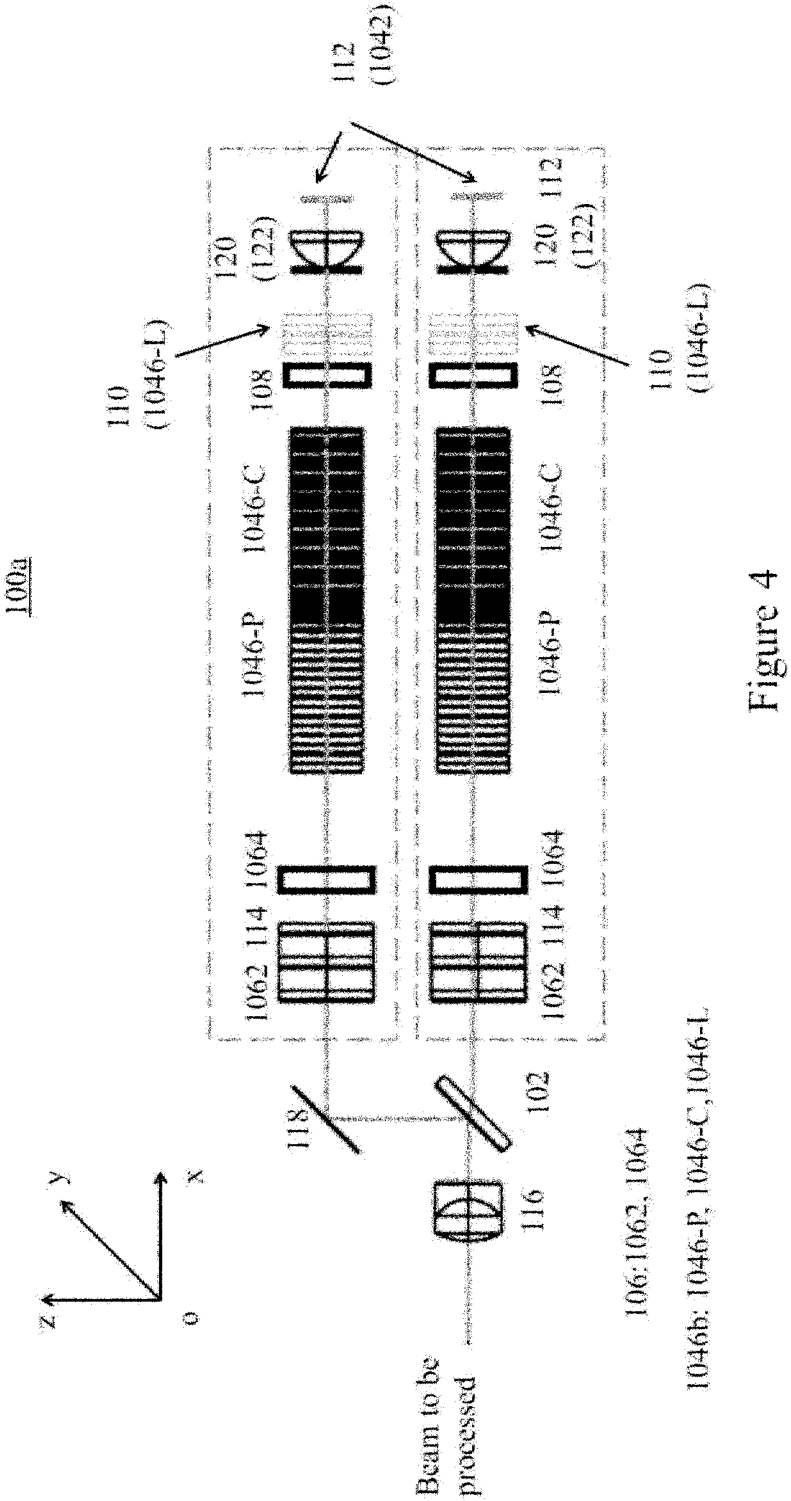
FIG. 4 is a side view showing an implementation of a light detecting system for a flow cytometer according to an embodiment of the present disclosure.
Figure 5A:
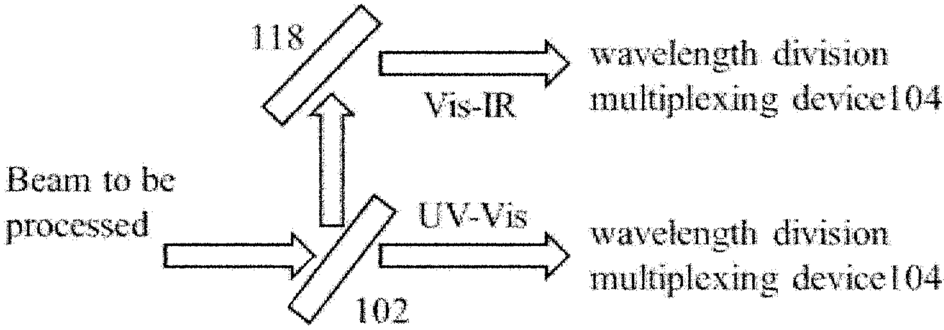
FIG. 5A and FIG. 5B are views showing an implementation of a beam separating device according to an embodiment of the present disclosure.
Figure 5B:
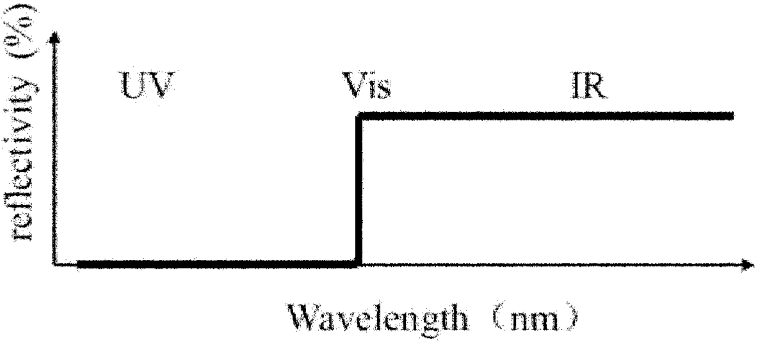
Figure 6A:
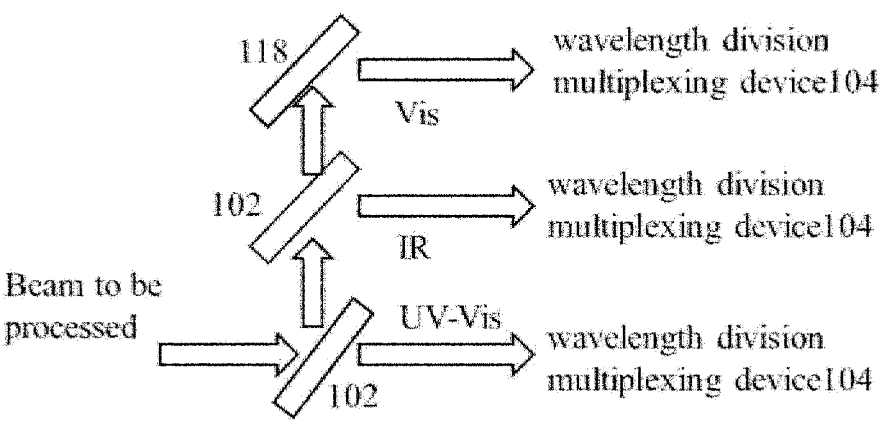
FIG. 6A, FIG. 6B and FIG. 6C are views showing another implementation of a beam separating device according to an embodiment of the present disclosure.
Figure 6B:
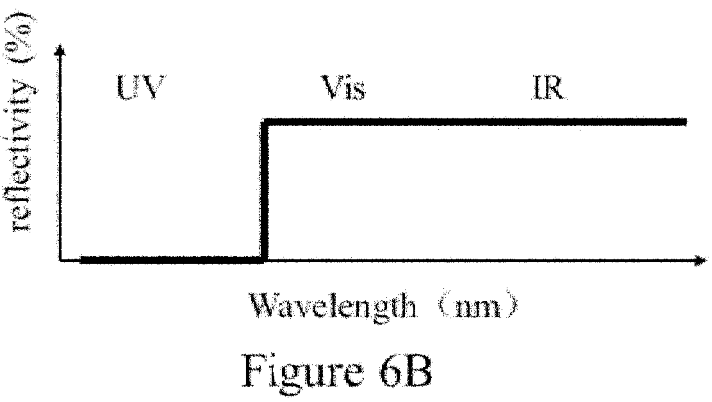
Figure 6C:
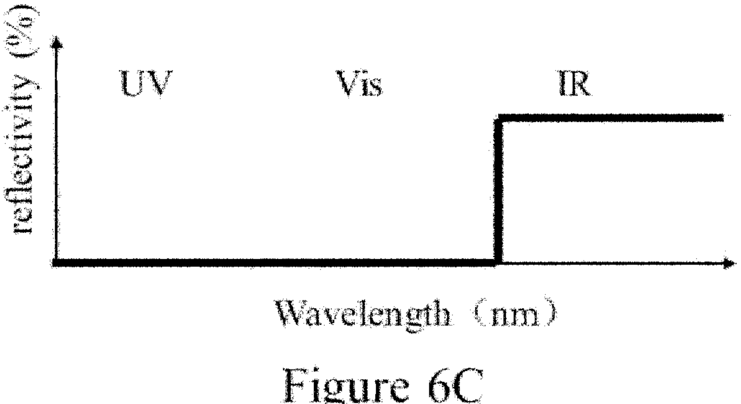
Figure 7:
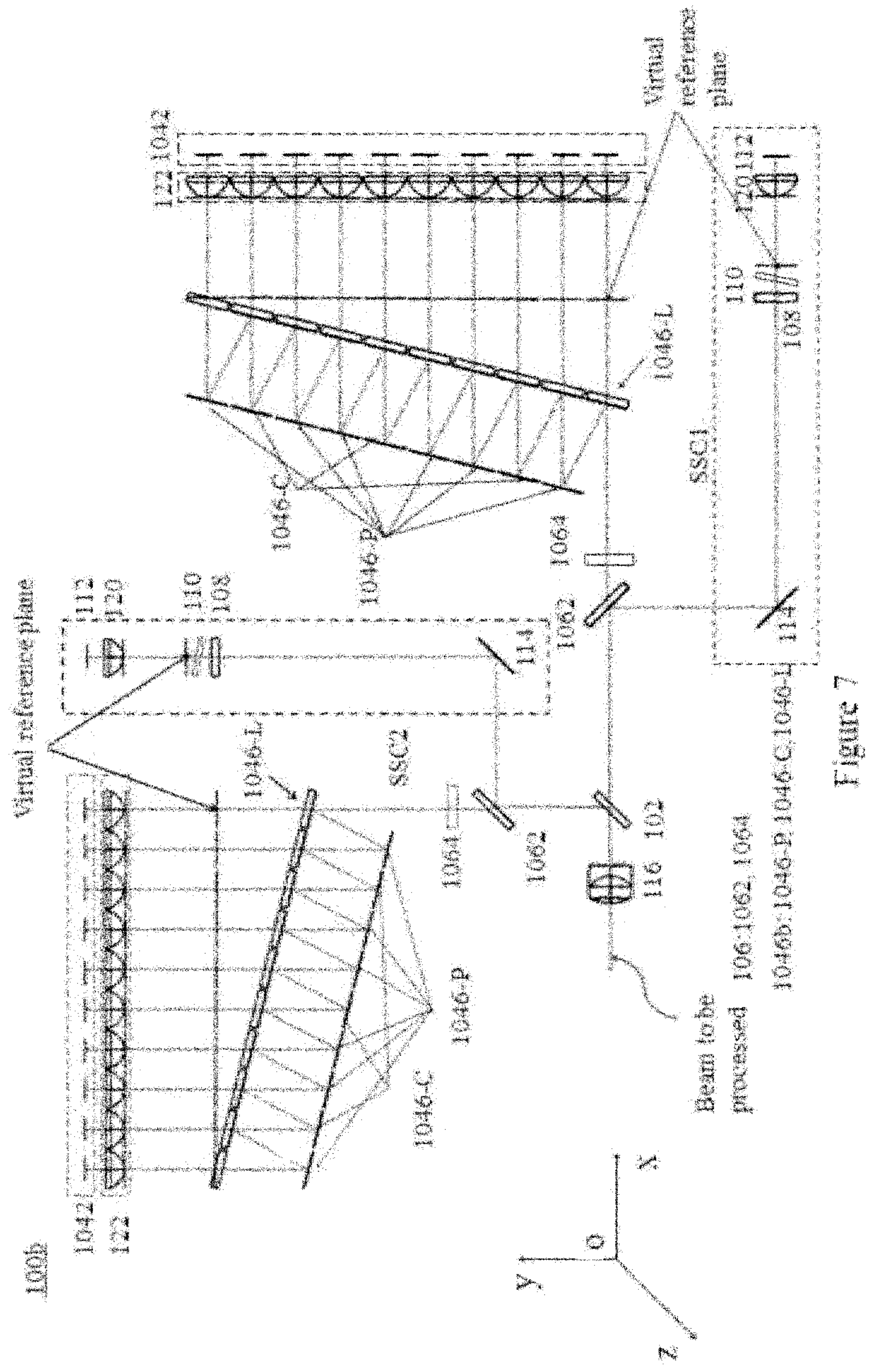
FIG. 7 is a top view showing another implementation of a light detecting system for a flow cytometer according to an embodiment of the present disclosure.

First, implementation examples of a light detecting system for a flow cytometer according to an embodiment of the present disclosure are described with reference to FIG. 1 to FIG. 7. FIG. 1 is a block diagram of a configuration example of a light detecting system 100 for a flow cytometer according to an embodiment of the present disclosure. FIG. 2, FIG. 3, and FIG. 4 are respectively a 3D layout, a top view, and a side view showing an implementation of the light detecting system 100 for a flow cytometer according to an embodiment of the present disclosure. FIG. 5A and FIG. 5B are views showing an implementation of a beam separating device according to an embodiment of the present disclosure. FIG. 6A, FIG. 6B and FIG. 6C are views showing another implementation of a beam separating device according to an embodiment of the present disclosure. FIG. 7 is a top view showing another implementation of a light detecting system for a flow cytometer according to an embodiment of the present disclosure.

As shown in FIG. 1 to FIG. 4, the light detecting system 100 for a flow cytometer according to the embodiment of the present disclosure includes a beam separating device 102 and multiple wavelength division multiplexing devices 104.

The beam separating device (also referred to as a "spectral band separating device") 102 is configured to separate a beam to be processed by the flow cytometer (which may also be referred to as a "beam to be processed" hereinafter) into multiple first beams having respective wavelength ranges that either do not overlap with each other or partially overlap with each other. For example, the beam to be processed may be transmitted to the beam separating device 102 through an optical fiber. In addition, for example, the beam to be processed may be transmitted to the beam separating device 102 through a free space by means of a coupled lens system.

As an example, the beam separating device 102 includes a long pass filter or a short pass filter. For example, as shown in FIG. 2 and FIG. 4, the beam separating device 102 may be arranged at 45 degrees to an optical axis of the beam to be processed to separate the beam to be processed into two first beams propagating along an x-axis direction and a z-axis direction, respectively. For example, in a case that the beam to be processed has a wavelength range from 350 nm to 950 nm, the beam separating device 102 separates the beam to be processed into two first beams having a wavelength range from 350 nm to A and a wavelength range from A to 950 nm, respectively. For example, A is greater than or equal to 400 nm and is less than or equal to 900 nm. It should be noted that in FIG. 4, the elements framed with dotted frames correspond to the two first beams, respectively.

As another example, the beam separating device 102 may include a dichroic mirror. For example, as shown in FIG. 5A and FIG. 5B, the dichroic mirror is capable of reflecting a visible light (Vis) in a certain band and an infrared light (IR) and transmitting an ultraviolet light (UV) and a visible light in another band, so as to separate the beam to be processed into two first beams. In addition, by arranging two or more dichroic mirror with different optical properties, the beam to be processed is separated into three or more first beams. For example, as shown in FIG. 6A, by arranging two dichroic mirrors with different optical properties as shown in FIG. 6B and FIG. 6C, the beam to be processed is separated into three first beams.

In FIG. 2, a gray line represents a beam. In addition, in FIG. 5A and FIG. 6A, an arrow represents a beam. As can be understood by those skilled in the art, an actual shape of a beam may be different from that shown in the drawings. In addition, relative position between the first beams is not limited by the drawings.

Each of the wavelength division multiplexing devices 104 is configured to receive a respective one of the multiple first beams. For example, the wavelength division multiplexing devices 104 may correspond to the first beams in one-to-one relationship.

Each one of the wavelength division multiplexing devices 104 includes multiple light detecting devices 1042 (not shown in FIG. 2). The light detecting devices 1042 are configured to detect (for example, to detect light intensity of) a portion of the first beam received by the wavelength division multiplexing device 104. For example, for each wavelength division multiplexing device 104, the wavelength division multiplexing device 104 may perform wavelength division multiplexing on the first beam received by the wavelength division multiplexing device 104 to obtain multiple second beams and transmit the multiple second beams to multiple light detecting devices 1042, respectively. It should be noted that although it is shown in FIG. 2 to FIG. 4 that the wavelength division multiplexing device 104 includes a wavelength division multiplexing unit 1046*b* shown in FIG. 11 to perform wavelength division multiplexing on the first beam received by the wavelength division multiplexing device, those skilled in the art may adopt another wavelength division multiplexing unit, for example, a wavelength division multiplexing unit 1046*a* shown in FIG. 8, a wavelength division multiplexing unit 1046*c* shown in FIG. 12, and the like, according to actual needs.

As an example, the multiple second beams may be focused on the multiple light detecting devices 1042 through multiple second aspheric lenses 122, as shown in FIG. 3 and FIG. 4.

The light detecting device 1042 may be, for example, an avalanche photodiode (APD).

The multiple first beams may be parallel to each other when received by the multiple wavelength division multiplexing devices 104. In this case, for example, the light detecting devices 1042 included in the multiple wavelength division multiplexing devices 104 may be arranged on a same plane, so as to facilitate, for example, temperature control for the light detecting devices 1042 and a layout of a signal processing circuit and wires.

As an example, in the light detecting system 100*a* as shown in FIG. 4, a transmission path of at least one of the multiple first beams may be changed by a second mirror 118, so that the multiple first beams are transmitted in parallel to the multiple wavelength division multiplexing devices 104. For example, the second mirror 118 may change the transmission path of a first beam by totally reflecting the first beam. The second mirror 118 may be a planar mirror.

As another example, the multiple first beams may be transmitted to the multiple wavelength division multiplexing devices 104 while not being parallel to each other. For example, in the light detecting system 100*b* shown in FIG. 7, the two beams may be transmitted to respective wavelength division multiplexing devices 104 at an angle of 90 degrees between the two beams. In addition, in practical application, the angle between the beams may be changed by configuring the beam separating device 102 as needed. For example, the angle between the two beams may range from 15 degrees to 165 degrees.

At present, the flow cytometry is developing from the conventional multi-color fluorescence channel to the high-channel fluorescence full spectrum. With the fluorescence full spectrum, more fluorescence information is acquired and more (up to 40 or more or more channels of) fluorescein and other information are analyzed at the same time, so as to acquire more sample expression information, thereby achieving a sensitive and accurate test result. In order to achieve this objective, high-density channel acquisition of the fluorescence spectrum is required to reflect a spectral feature of the fluorescence.

As described above, in the light detecting system 100 according to the embodiment of the present disclosure, the beam to be processed (for example, including a fluorescent light signal) is separated into multiple first beams by the beam separating device 102, and then the first beams are multiplexed and detected by the wavelength division multiplexing devices 104, so that the number of light channels is easily increased (for example, increased to 20 or more) and a good optical property is maintained. In addition, compared with a case that the beam to be processed is multiplexed and detected by the wavelength division multiplexing device directly, with the light detecting system 100, an optical path length of the last one or more channels corresponding to the first beams and the number of optical elements through which the first beams are passed are reduced, thereby improving an optical transmission efficiency of the last one or more channels and reducing a size of the wavelength division multiplexing device 104.

In addition, the light detecting system 100 may be compatible with a dual-port wavelength division multiplexing structure. Two excitation sources (an example of an object generating the beam to be processed) with a small number (for example, less than or equal to 10) of channels may share one dual-port wavelength division multiplexing structure, which saves a cost.

As an example, the multiple first beams may be transmitted in a layered layout in a vertical direction (for example, a z-axis direction shown in FIG. 2), so that, for example, the size of the wavelength division multiplexing device 104 can be further reduced. According to an embodiment of the present disclosure, the beam to be processed by the flow cytometer may include a side scatter light signal and a fluorescent light signal. In this case, as shown in FIGS. 3 and 4, the light detecting system may further include multiple side scatter light signal separating devices 106. Each of the multiple side scatter light signal separating devices 106 is configured to separate a side scatter light signal from a respective one of the multiple first beams (that is, a first beam transmitted to the side scatter light signal separating devices 106) and transmit the separated respective first beam to a respective one of the multiple wavelength division multiplexing devices (for example, a wavelength division multiplexing device configured to multiplex and detect the separated respective first beam), so that the influence of the side scatter light signal on the fluorescent light signal is reduced, thereby improving a signal-to-noise ratio of the fluorescent light signal. For example, the multiple side scatter light signal separating devices 106 may correspond to the multiple first beams in one-to-one relationship.

As an example, the beam to be processed may include a beam collected from a micro-particle, and a fluorescent light signal may include a fluorescence light signal emitted from the micro-particle.

According to an embodiment of the present disclosure, each side scatter light signal separating device 106 may include a first side scatter light signal separating unit 1062 and a second side scatter light signal separating unit 1064 (not shown in FIG. 2). The first side scatter light signal separating unit 1062 may be configured to separate a side scatter light signal from the respective first beam, and the second side scatter light signal separating unit 1064 may be configured to further separate the side scatter light signal from the respective first beam separated by the first side scatter light signal separating unit 1062 and transmit the separated respective first beam to a respective one of the multiple wavelength division multiplexing devices 104, so that, for example, the signal-to-noise ratio of the fluorescent light signal is further improved.

For example, the first side scatter light signal separating unit 1062 may include a long bandpass filter. For example, the long bandpass filter may be disposed at 20 degrees to 50 degrees relative to an optical axis of a corresponding first beam to reflect the side scatter light signal and transmit the fluorescent light signal.

As an example, the second side scatter light signal separating unit 1064 may include a long bandpass filter. For example, the long bandpass filter may be disposed at −5 degrees or 5 degrees relative to the optical axis of a corresponding first beam to deeply isolate a residual side scatter light signal in the multiple first beams from the first side scatter light signal separating unit 1062.

For example, as shown in FIG. 3, FIG. 4 and FIG. 7, the light detecting system 100 may further include multiple attenuating devices 108, multiple first bandpass filters 110, and multiple first light detecting units 112. Each of the multiple attenuating devices 108 may be configured to attenuate the side scatter light signal separated by the first side scatter light signal separating unit 1062 corresponding to the attenuating device 108 to prevent the side scatter light signal from saturating a first light detecting unit 112. Each of the multiple first bandpass filters 110 may be configured to perform a bandpass filtering on the side scatter light signal attenuated by the attenuating device 108 corresponding to the first bandpass filter 110. Each of the multiple first light detecting units 112 may be configured to detect (for example, detect intensity of) the side scatter light signal filtered by the first bandpass filter 110 corresponding to the first light detecting unit 112, so that, for example, a size of a micro-particle screened by the flow cytometry is detected.

For example, the multiple attenuating devices 108 may have a same attenuation coefficient, or at least one of the multiple attenuating devices 108 has an attenuation coefficient different from that of other attenuating devices 108. Similarly, the multiple first bandpass filters 110 may have a same optical property, or at least one of the multiple first bandpass filters 110 has an optical property different from that of other first bandpass filters 110.

As an example, in a case that the beam to be processed is separated into two first beams by the beam separating device 102, an intensity of a side scatter light signal included in one of the two first beams (referred to as "SSC1" hereafter) and an intensity of a side scatter light signal included in the other one of the two first beams (referred to as "SSC2" hereafter) are b % and 1−b % of an intensity of the side scatter light signal included in the beam to be processed (referred to as "SSC" hereafter), respectively, where $1 \le b \le 2$. On one hand, a side scatter light signal generated by small particles (such as particles with nanometer sizes) is weak, so that it is desired to improve an efficiency of collecting the side scatter light signal from small particles as much as possible. On the other hand, a side scatter light signal generated by large particles (such as cells with micron sizes) is strong, which results in that the light detecting device is easily saturated, so that it is desired to reduce an efficiency of collecting the side scatter light signal from large particles. In a case that SSC1 and SSC2 are configured as described above, for example, SSC1 may be used to detect a cell with a size ranging from 1 μm to 30 μm and SSC2 may be used to detect a small particle with a size ranging from 80 nm to 1 μm, so that, for example, the accuracy of detecting particles is further improved. For example, in the light detecting system 100*a* shown in FIG. 4, elements framed with an upper dotted frame and elements framed with a lower dotted frame may correspond to the first beam including SSC1 and the first beam including SSC2, respectively. In addition, for example, in the light detecting system 100*b* shown in FIG. 7, elements framed with a dotted frame indicated by a reference numeral SSC1 may be used for transmission and detection of SSC1, and elements framed with a dotted frame indicated by a reference numeral SSC2 may be used for transmission and detection of SSC2.

For example, as shown in FIG. 2 to FIG. 4 and FIG. 7, the light detecting system 100 may further include multiple first mirrors 114. Each of the multiple first mirrors 114 is configured to change a transmission path of the side scatter light signal separated by the first side scatter light signal separating unit 1062 corresponding to the first mirror 114 to transmit the side scatter light signal to a respective one of the multiple attenuating devices 108.

For example, as shown in FIG. 3, the first mirror 114 may be disposed at 20 degrees to 50 degrees relative to an optical axis of the side scatter light signal from the first side scatter light signal separating unit 1062 corresponding to the first mirror 114 to reflect the side scatter light signal, so as to change the transmission path of the side scatter light signal, so that, for example, the side scatter light signal and the first beam separated by the first side scatter light signal separating unit 1062 are transmitted in parallel. In this case, for example, the multiple first light detecting units 112 and the multiple light detecting devices 1042 may be disposed on a same plane, so as to, for example, facilitate temperature control for the multiple first light detecting units 112 and the multiple light detecting devices 1042 and facilitate a layout of a signal processing circuit and wires. For example, the multiple first light detecting units 112 and the multiple light detecting devices 1042 may be disposed with reference to a virtual reference plane represented by a dotted line in FIG. 3, so that the multiple first light detecting units 112 and the multiple light detecting devices 1042 are accurately disposed on the same plane.

For example, as shown in FIG. 3, FIG. 4 and FIG. 7, the light detecting system 100 may further include multiple first aspheric lens 120 disposed between the multiple first bandpass filters 110 and the multiple first light detecting units 112. Each of the multiple first aspheric lens 120 is configured to focus the side scatter light signal filtered by the first bandpass filter 110 corresponding to the first aspheric lens 120 to a respective one of the multiple first light detecting units 112.

For example, as shown in FIG. 3, FIG. 4 and FIG. 7, the light detecting system 100 may further include an achromatic lens 116 configured to collimate the beam to be processed and transmit the collimated beam to the beam separating device 102. For example, the beam to be processed is collected through coupling by an optical fiber. In addition, for example, the beam to be processed may be transmitted to the achromatic lens 116 through a free space by means of a coupled lens system.

The wavelength division multiplexing unit according to the embodiments of the present disclosure is described in detail below with reference to FIG. 8 to FIG. 12.

Figure 8:
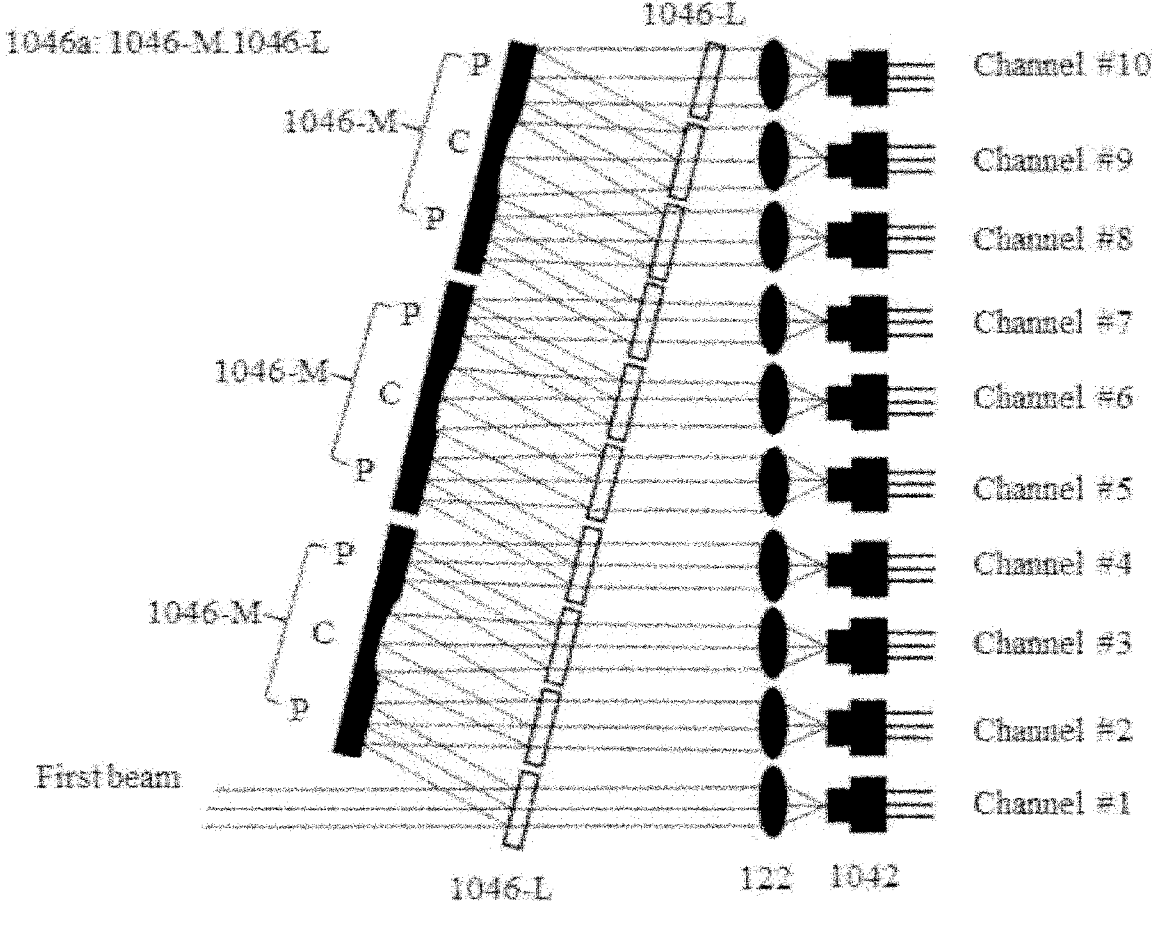
FIG. 8 is a schematic diagram of an implementation of a wavelength division multiplexing unit according to an embodiment of the present disclosure.

FIG. 8 is a schematic diagram of an implementation of a wavelength division multiplexing unit according to an embodiment of the present disclosure. As shown in FIG. 8, a wavelength division multiplexing unit 1046*a* may include multiple mirrors 1046-M and multiple second bandpass filters 1046-L disposed opposite to the multiple mirrors 1046-M. Each mirror 1046-M may be configured to reflect a beam transmitted from a respective one of the multiple second bandpass filters 1046-L to the mirror 1046-M. For example, each mirror 1046-M may include a concave portion (for example, a foveate portion) C disposed between a pair of planar portions P. Each concave portion C is configured to reflect a beam transmitted to the concave portion C from a corresponding one of the multiple second bandpass filters 1046-L to collimate the beam. In addition, each second bandpass filter 1046-L may be configured to transmit light having a wavelength within a wavelength range corresponding to the second bandpass filter 1046-L and reflect other light. Therefore, the beam propagates in zigzag between the multiple mirrors 1046-M and the multiple second bandpass filters 1046-L to separate a corresponding light beam (for example, the first beam) into multiple second beams, for example, 10 second beams corresponding to a channel #1 to a channel #10 shown in FIG. 8. In addition, by disposing the concave portion C between the planar portions P, a divergent light transmitted over a certain distance is collimated to realize long-distance transmission, which is conducive to detecting more channels. It should be noted that, although FIG. 8 shows that adjacent mirrors 1046-M are disposed at intervals, the multiple mirrors 1046-M may be disposed without intervals therebetween as needed. In addition, for example, the multiple mirrors 1046-M may be disposed as a single mirror 1046-M with one or more planar portions P and concave portions C, and extending the length of wavelength division multiplexing unit 1046*a*.

In some examples, directivity of the beam may be adjusted by adjusting a relative position between the second bandpass filter 1046-L and the corresponding mirror 1046-M, for example, a distance between a center of the second bandpass filter 1046-L and a center of the corresponding mirror 1046-M in a direction along which the second bandpass filters 1046-L are arranged, so as to further ensure that the beam propagates in zigzag.

Figure 9A:
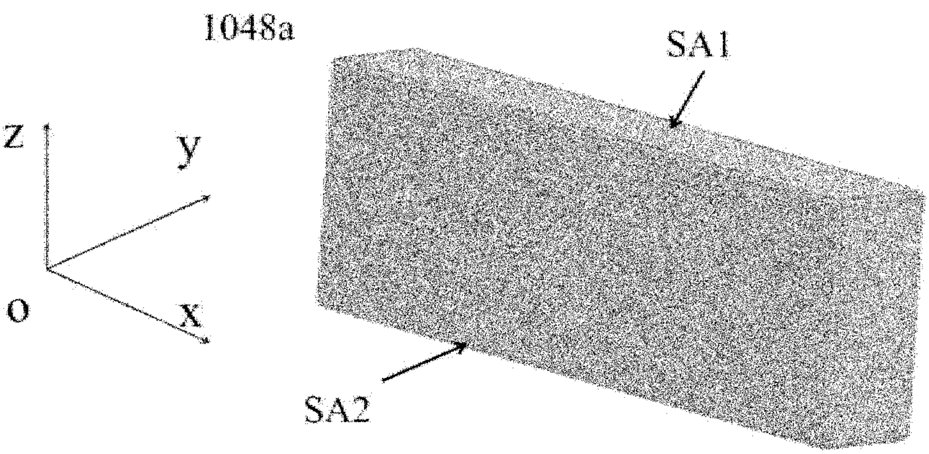
FIG. 9A shows an example of a support base included in a wavelength division multiplexing device according to an embodiment of the present disclosure.

As an example, the wavelength division multiplexing device 104 may further include a support base 1048*a* as shown in FIG. 9A. For example, as shown in FIG. 9B, the multiple mirrors (also referred to as a "mirror array") may be disposed on a first surface SA1 of support base 1048*a*, and the multiple second bandpass filters (also referred to as a "second bandpass filter array") may be disposed on a second surface SA2 of the support base 1048*a* that is opposite and parallel to the first surface SA1, ensuring parallelism between the mirror array and the second bandpass filter array and improving the light transmission efficiency.

Figure 9B:
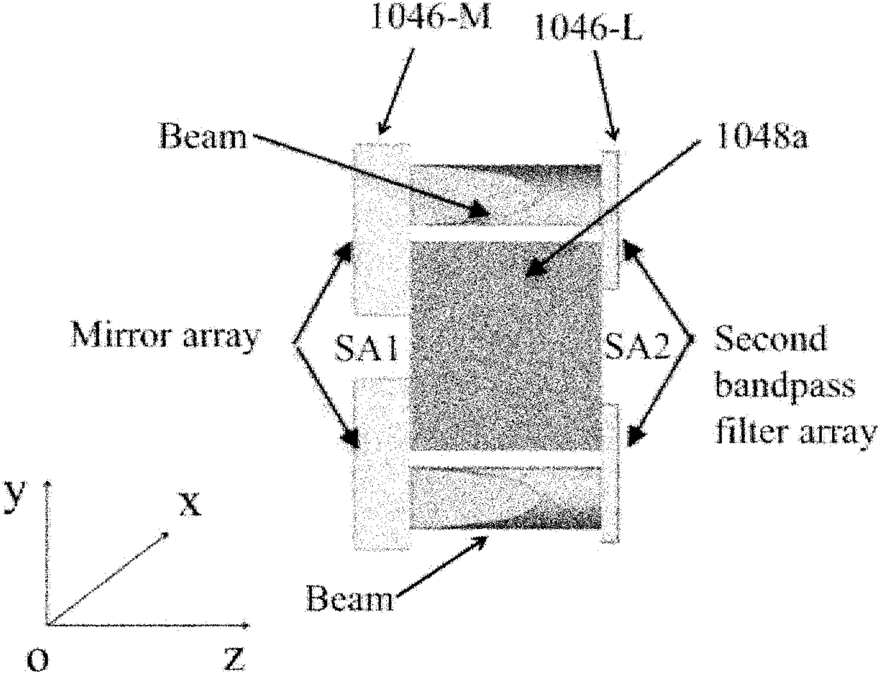
FIG. 9B is a schematic diagram showing arrangement of a wavelength division multiplexing unit on a support base according to an embodiment of the present disclosure.

For example, as shown in FIG. 9B, the multiple mirrors 1046-M and the multiple second bandpass filters 1046-L may be disposed to exceed the first surface SA1 and the second surface SA2 respectively, so that the beam is transmitted without passing through the interior of the support base 1048*a*, which avoids an interface light loss (Ferrer reflection loss) caused by light transmission through the interior of the support base 1048*a*, thereby further improving the light transmission efficiency. In addition, light scattering caused by crystallization or bubble in a material of the support base 1048*a* is avoided, so that light signal crosstalk between different channels is reduced.

Figure 10A:
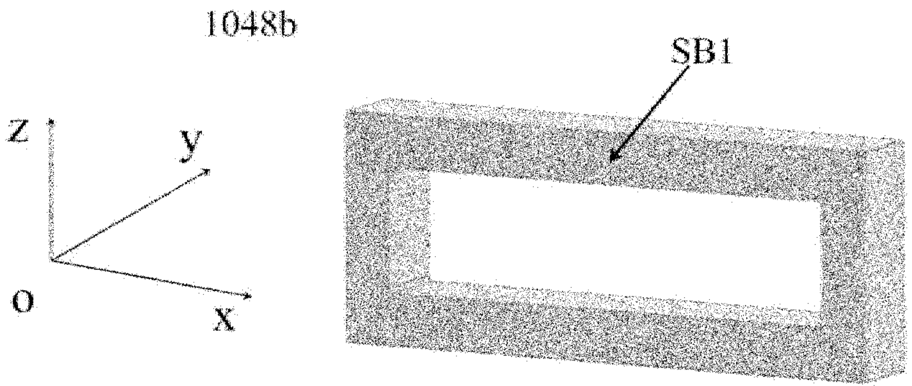
FIG. 10A shows another example of a support base included in a wavelength division multiplexing device according to an embodiment of the present disclosure.
Figure 10B:
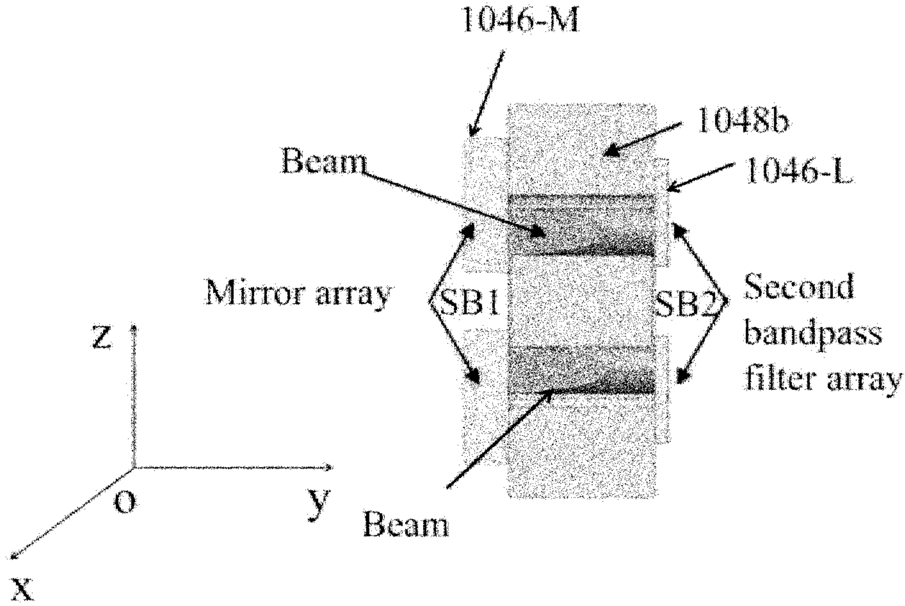
FIGS. 10B to 10D are schematic diagrams showing arrangement of a wavelength division multiplexing unit on a support base according to an embodiment of the present disclosure.
Figure 10C:
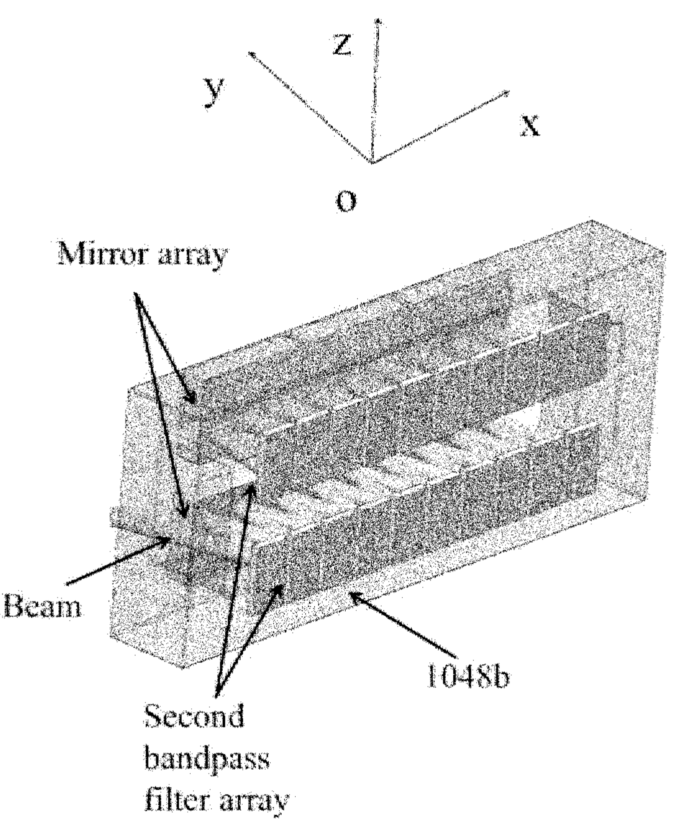
Figure 10D:
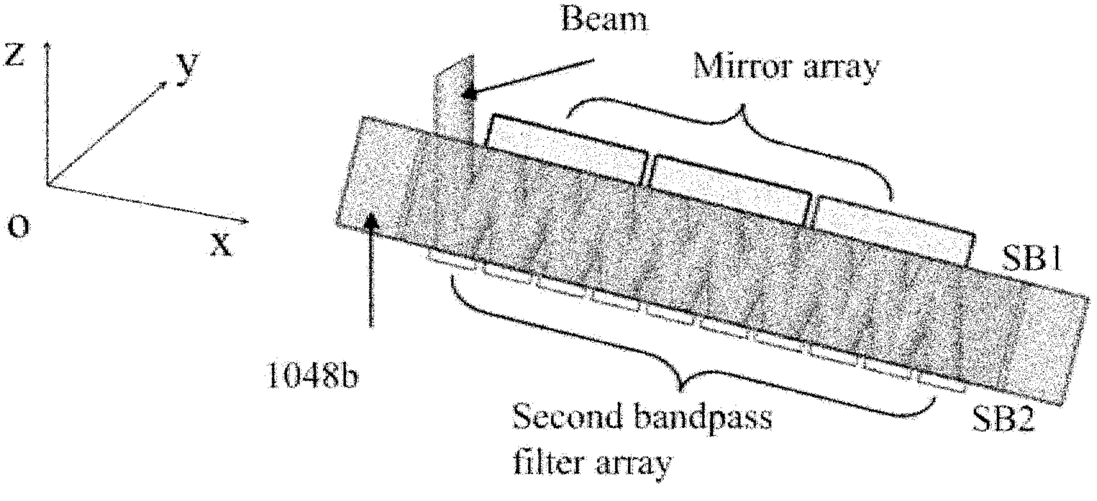

As another example, the wavelength division multiplexing device 104 may further include a support base 1048*b* with a hollow interior as shown in FIG. 10A. For example, as shown in FIG. 10B to FIG. 10D, the multiple mirrors 1046-M may be disposed on a first surface SB1 of support base 1048*b*, and the multiple second bandpass filters 1046-L may be disposed on a second surface SB2 of the support base 1048*b* that is opposite and parallel to the first surface SB1, ensuring parallelism between the multiple mirrors 1046-M and the multiple second bandpass filters 1046-L and improving the light transmission efficiency. In addition, in this case, the beam is transmitted through the hollow interior, which avoids an interface light loss, thereby further improving the light transmission efficiency. Furthermore, light scattering caused by crystallization or bubble inside a material of the support base 1048*b* is avoided, so that light signal crosstalk between different channels is reduced. Moreover, the hollow interior greatly reduces the quality of the support base 1048*b* while ensuring the parallelism and structural strength.

For example, the same material as the support base 1048*b* or any other material with a refractive index greater than 1 such as glass, polymer, and fluid may be filled in the hollow interior of the support base 1048*b*.

For example, two wavelength division multiplexing devices 104 may share one support base 1048. For example, in the examples shown in FIG. 9B and FIG. 10B, the upper mirror array and second bandpass filter array correspond to one of the two wavelength division multiplexing devices 104, and the lower mirror array and second bandpass filter array correspond to the other of the two wavelength division multiplexing devices 104, so that, for example, the size and the weight of the wavelength division multiplexing device 104 can be reduced.

For example, the wavelength division multiplexing units 1046 included in the multiple wavelength division multiplexing devices may be disposed as one body.

The support base 1068 may be made of a transparent material or a non-transparent material. For example, the support base 1068 may be made of metal, glass, and/or polymer.

Figure 11:
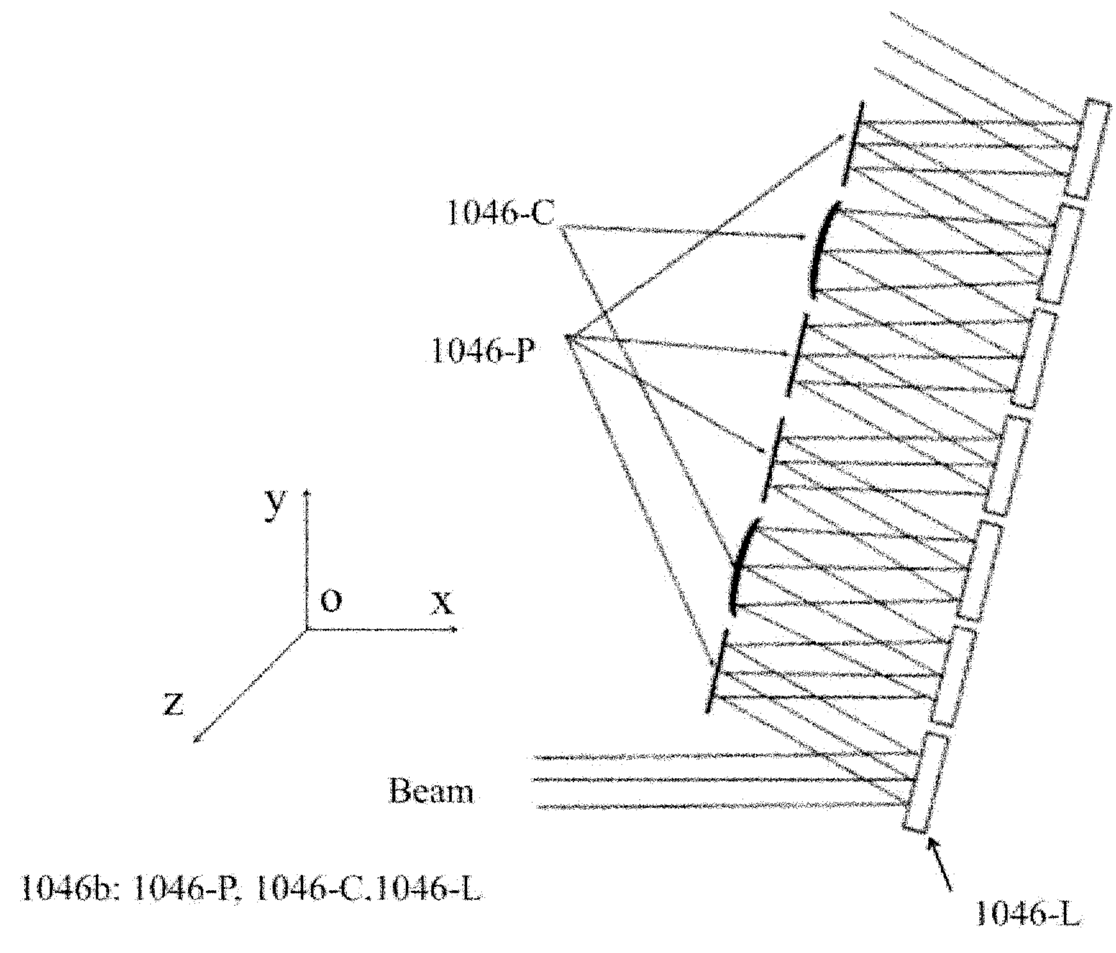
FIG. 11 is a schematic diagram of another implementation of a wavelength division multiplexing unit according to an embodiment of the present disclosure.

FIG. 11 is a schematic diagram of another implementation of a wavelength division multiplexing unit according to an embodiment of the present disclosure. The wavelength division multiplexing unit 1046*b* shown in FIG. 11 is different from the wavelength division multiplexing unit 1046*a* shown in FIG. 8 in that the mirrors 1046-M are replaced with multiple planar mirrors 1046-P and multiple concave mirrors 1046-C that are arranged alternately. Similar to the planar portion P of the mirror 1046-M, each planar mirror 1046-P may be configured to reflect a beam transmitted to the planar mirror 1046-P from a corresponding second bandpass filter 1046-L of the multiple second bandpass filters 1046-L. In addition, similar to the concave portion C of the mirror 1046-M, each concave mirror 1046-C may be configured to reflect a beam transmitted to the concave mirror from a second bandpass filter 1046-L corresponding to the concave mirror of the multiple second bandpass filters 1046-L to collimate the beam. Although FIG. 11 shows that one planar mirror 1046-P is disposed between two concave mirrors 1046-C, two or more planar mirrors 1046-P may be disposed between two concave mirrors 1046-C as needed. For example, as shown in FIG. 3 and FIG. 7, two planar mirrors 1046-P are disposed between two concave mirrors 1046-C.

Figure 12:
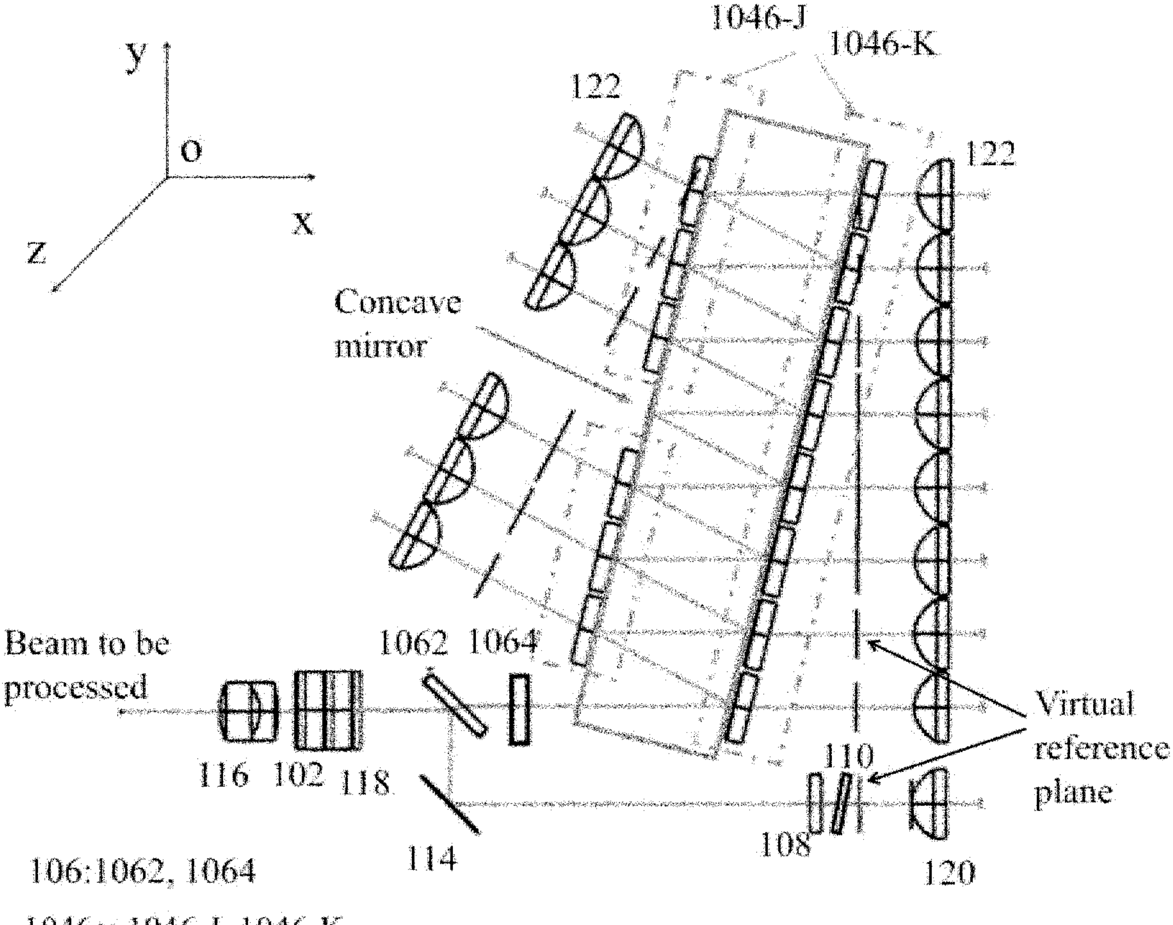
FIG. 12 is a schematic diagram of yet another implementation of a wavelength division multiplexing unit according to an embodiment of the present disclosure.

FIG. 12 is a schematic diagram of still another implementation of a wavelength division multiplexing unit according to an embodiment of the present disclosure. A wavelength division multiplexing unit 1046*c* may include multiple third bandpass filters 1046-J and multiple fourth bandpass filters 1046-K disposed opposite to the multiple third bandpass filters 1046-J. Each of the third bandpass filters 1046-J and the fourth bandpass filters 1046-K transmits light having a wavelength within a wavelength range corresponding to the bandpass filter and reflects other light. For example, as shown in FIG. 12, a concave mirror may be disposed between some of the multiple third bandpass filters

1046-J to collimate a beam transmitted to the concave mirror from a corresponding fourth bandpass filter 1046-K of the multiple fourth bandpass filters 1046-K. Compared with the wavelength division multiplexing units 1046*a* and 1046*b*, the wavelength division multiplexing unit 1046*c* further increases the number of fluorescence channels. It should be noted that, although only one concave mirror is disposed as shown in FIG. 12, two or more concave mirrors may be disposed according to actual needs. For example, the third bandpass filters 1046-J and the concave mirrors may be alternately disposed in a same way as that of the planar mirrors 1046-P and the concave mirrors 1046-C as described above with reference to FIG. 11. In addition, positions of the concave mirrors are not limited by the drawings.

For example, the wavelength division multiplexing units 1046*b* and 1046*c* may be arranged in a manner similar to the arrangement of the wavelength division multiplexing unit 1046*a* described with reference to FIG. 9A to FIG. 10D, which is not repeated herein.

In the wavelength division multiplexing unit 1046 described above with reference to FIG. 8 to FIG. 12, the number of fluorescence channels may be easily increased by increasing the number of corresponding elements (for example, the mirrors 1046-M and the second bandpass filters 1046-L shown in FIG. 8).

The above mainly describes the light detecting system for a flow cytometry. However, the light detecting system may be applied to another device such as a sorting device.

Figure 13:
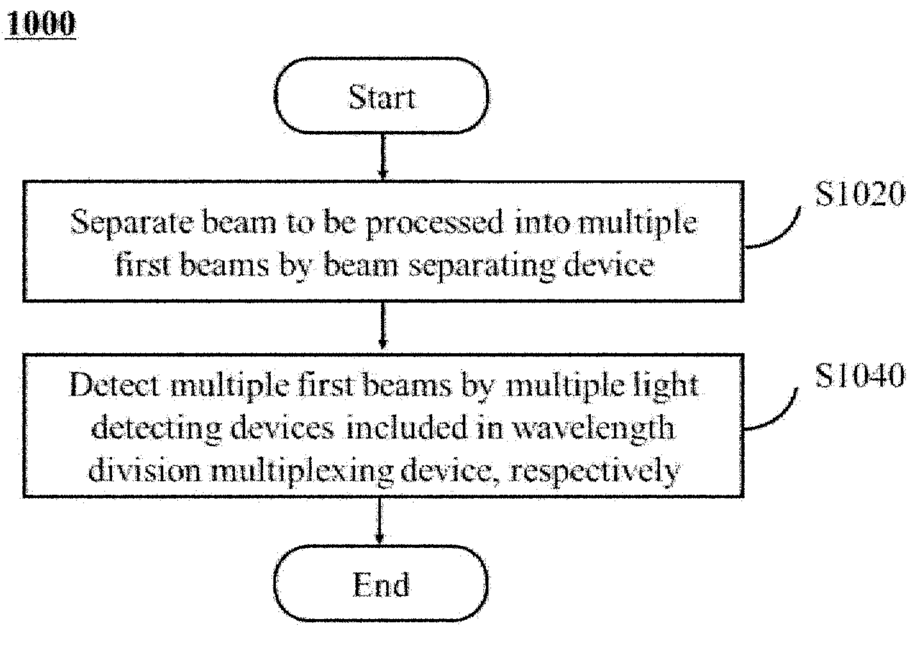
FIG. 13 is a flowchart showing an exemplary flow of a light detecting method for a flow cytometry according to an embodiment of the present disclosure.

According to an embodiment of the present disclosure, a light detecting method for a flow cytometry is provided. FIG. 13 is a flowchart of a light detecting method 1000 for a flow cytometry according to an embodiment of the present disclosure.

As shown in FIG. 13, the light detecting method 1000 includes a beam separating step S1020 and a beam detecting step S1040.

In the beam separating step S1020, a beam to be processed by the flow cytometry (which may also be referred to as a "beam to be processed" hereinafter) is separated, by a beam separating device, into multiple first beams having respective wavelength ranges that either do not overlap with each other or partially overlap with each other. For example, the beam to be processed may be separated into multiple first beams by the beam separating device 102 described above.

In the beam detecting step S1040, the multiple first beams are detected, respectively, by multiple light detecting devices included in multiple wavelength division multiplexing devices (for example, the wavelength division multiplexing devices 104). For example, the multiple first beams are parallel to each other when received by the wavelength division multiplexing devices.

With the light detecting method 1000 according to the embodiment of the present disclosure, the beam to be processed is separated into multiple first beams by the beam separating device, and then the multiple first beams are multiplexed and detected by the wavelength division multiplexing device, so that the number of light channels is easily increased (for example, increased to 20 or more) and good optical performance is maintained.

As an example, the beam to be processed may include a side scatter light signal and a fluorescent light signal. In this case, the light detecting method 1000 may further include separating the side scatter light signal from the multiple first beams by a side scatter light signal separating device, and transmitting the separated multiple first beams to the wavelength division multiplexing device. For example, the side scatter light signal may be separated from the multiple first beams by the side scatter light signal separating device 106 described above.

For example, the beam to be processed may include a beam collected from a micro-particle and the fluorescent light signal may include a fluorescence signal emitted from the micro-particle.

For example, the light detecting method 1000 may further include: attenuating, by an attenuating device (for example, the attenuating device 108 as shown in FIG. 2 to FIG. 4), the side scatter light signal obtained through separation by the side scatter light signal separating device; performing, by a first bandpass filter (for example, the first bandpass filter 110 as shown in FIG. 2 to FIG. 4), a bandpass filtering on the side scatter light signal attenuated by the attenuating device, and detecting, by a first light detecting unit (for example, the first light detecting unit 112 as shown in FIG. 3 and FIG. 4), the side scatter light signal filtered by the first bandpass filter, so as to detect, for example, a size of an object which is a source of the side scatter light signal.

As an example, the light detecting method 1000 may further include: changing a transmission path of at least one of the multiple first beams by a second mirror, so that the multiple first beams are transmitted in parallel.

It should be noted that though functional configurations of the light detecting system and the light detecting method according to the embodiments of the present disclosure have been described above, the above descriptions are merely illustrative rather than restrictive. Those skilled in the art may modify the above embodiments based on principles of the present disclosure. For example, those skilled in the art may add, delete or combine functional modules and operations in the above embodiments. Such modifications fall within the scope of the present disclosure.

It should further be noted that, the details described in the system embodiment may be applied to the method embodiment, and similarly, the details described in the method embodiment may be applied to the system embodiment.

In addition, a storage medium and a program product are further provided according to the present disclosure. It should be understood that machine executable instructions in the storage medium and the program product according to embodiments of the present disclosure may further be configured to perform the above light detecting method. Therefore, details not described here may refer to corresponding parts in the above, and are not repeated here.

Accordingly, a storage medium for carrying the program product including machine executable instructions is also included in the present disclosure. The storage medium includes but is not limited to a floppy disk, an optical disk, a magneto-optical disk, a memory card, a memory stick and the like.

In addition, it should further be pointed out that the above series of processing and devices may also be implemented by software and/or firmware. In a case that the above series of processing and apparatuses are implemented by software and/or firmware, a program constituting the software is installed from a storage medium or network to a computer with a dedicated hardware structure, for example, a general-purpose personal computer 1700 shown in FIG. 14. The computer can perform various functions when being installed with various programs.

Figure 14:
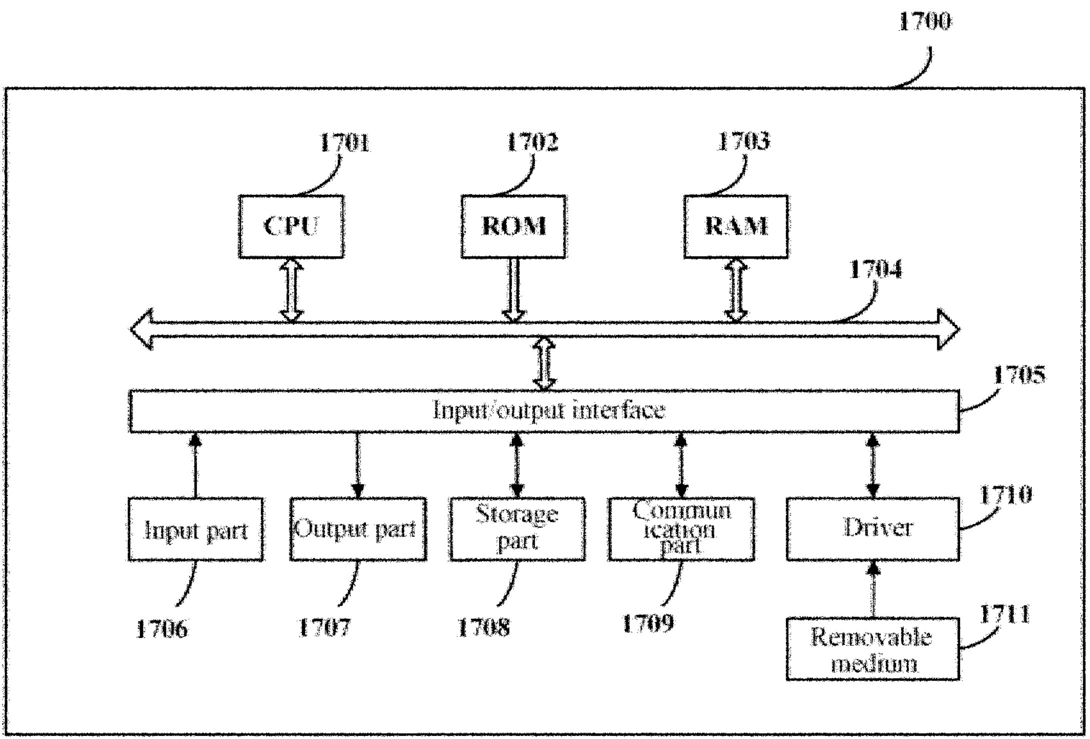
FIG. 14 is a block diagram of an exemplary structure of a personal computer applicable to the embodiments of the present disclosure.

In FIG. 14, a central processing unit (CPU) 1701 executes various processing according to a program stored in a read-only memory (ROM) 1702 or a program loaded from a storage part 1708 to a random access memory (RAM)

1703. Data required when the CPU 1701 performs various processing is also stored in the RAM 1703 as needed.

The CPU 1701, the ROM 1702 and the RAM 1703 are connected each other via a bus 1704. An input/output interface 1705 is also connected to the bus 1704.

The following parts are connected to the input/output interface 1705: an input part 1706 including a keyboard, a mouse and the like; an output part 1707 including a display such as a cathode ray tube (CRT) and a liquid crystal display (LCD), a loudspeaker and the like; a storage part 1708 including a hard disk and the like; and a communication part 1709 including a network interface card such as a local area network (LAN) card, a modem and the like. The communication part 1709 performs communication processing via a network such as the Internet.

A driver 1710 may also be connected to the input/output interface 1705 as needed. A removable medium 1711 such as a magnetic disk, an optical disk, a magneto-optical disk, and a semiconductor memory is mounted on the driver 1710 as needed, so that a computer program read from the removable medium 1711 is installed in the storage part 1708 as needed.

In a case that the above series of processing is implemented by software, the program constituting the software is installed from the network such as the Internet or the storage medium such as the removable medium 1711.

Those skilled in the art should understand that the storage medium is not limited to the removable medium 1711 shown in FIG. 14 that has the program stored therein and is distributed separately from the apparatus so as to provide the program to the user. Examples of the removable medium 1711 include a magnetic disk (including a floppy disk (registered trademark)), an optical disk (including a compact disk read only memory (CD-ROM) and a digital versatile disc (DVD)), a magneto-optical disk (including a MiniDisc (MD) (registered trademark)), and a semiconductor memory. Alternatively, the storage medium may be the ROM 1702, a hard disk included in the storage part 1708 or the like. The storage medium has a program stored therein and is distributed to the user together with a device in which the storage medium is included.

Preferred embodiments of the present disclosure have been described above with reference to the drawings. However, the present disclosure is not limited to the above embodiments. Those skilled in the art may obtain various modifications and changes within the scope of the appended claims. It should be understood that these modifications and changes naturally fall within the technical scope of the present disclosure.

For example, multiple functions implemented by one unit in the above embodiments may be implemented by separate devices. Alternatively, multiple functions implemented by multiple units in the above embodiments may be implemented by separate devices, respectively. In addition, one of the above functions may be implemented by multiple units. Of course, such configuration is included in the technical scope of the present disclosure.

In this specification, the steps described in the flowchart include not only processing performed in time series in the described order, but also processing performed in parallel or individually rather than necessarily in time series. Furthermore, the steps performed in time series may be performed in another order appropriately.

The invention claimed is:

1. A light detecting system for a flow cytometer, comprising:

a beam separating device configured to separate a beam to be processed by the flow cytometer into a plurality of first beams having respective wavelength ranges that either do not overlap with each other or partially overlap with each other; and a plurality of wavelength division multiplexing devices, each of which is configured to receive a respective one of the plurality of first beams, the plurality of first beams being parallel to each other when received by the plurality of wavelength division multiplexing devices, wherein each of the plurality of wavelength division multiplexing devices includes a plurality of light detecting devices configured to detect a portion of the respective first beam.

2. The light detecting system according to claim 1, wherein the beam to be processed by the flow cytometer includes a side scatter light signal and a fluorescent light signal; and the light detecting system further includes a plurality of side scatter light signal separating devices, each being configured to separate a side scatter light signal from a respective one of the plurality of first beams and transmit the separated respective first beam to a respective one of the plurality of wavelength division multiplexing devices.

3. The light detecting system according to claim 2, wherein each side scatter light signal separating device comprises:

a first side scatter light signal separating unit configured to separate the side scatter light signal from the respective first beam;

a second side scatter light signal separating unit configured to further separate the side scatter light signal from the separated respective first beam and transmit the separated respective first beam to a respective one of the plurality of wavelength division multiplexing devices.

4. The light detecting system according to claim 3, further including:

a plurality of attenuating devices, each being configured to attenuate the side scatter light signal separated by the first side scatter light signal separating unit included in a respective one of the plurality of side scatter light signal separating devices;

a plurality of first bandpass filters, each being configured to perform a bandpass filtering on the side scatter light signal attenuated by a respective one of the plurality of attenuating devices, and a plurality of first light detecting units, each being configured to detect the side scatter light signal filtered by a respective one of the plurality of first bandpass filters.

5. The light detecting system according to claim 4, further including:

a plurality of first mirrors, each being configured to change a transmission path of the side scatter light signal separated by the first side scatter light signal separating unit included in a respective one of the plurality of side scatter light signal separating devices, to transmit the side scatter light signal to a respective one of the plurality of attenuating devices.

6. The light detecting system according to claim 5, wherein separating a beam to be processed by the flow cytometer into a plurality of first beams includes separating the beam to be processed by the flow cytometer into two first beams, and wherein an intensity of a side scatter light signal included in one of the two first beams and an intensity of a side scatter light signal included in the other one of the two first beams are b % and 1−b % of an intensity of the side scatter light signal included in the beam to be processed by the flow cytometer, respectively, 1≤b≤2.

7. The light detecting system according to claim 4, further including a plurality of first aspheric lens disposed between the plurality of first bandpass filters and the plurality of first light detecting units, each being configured to focus the side scatter light signal filtered by a respective one of the plurality of first bandpass filters to a respective one of the plurality of first light detecting units.

8. The light detecting system according to claim 2, wherein:

the beam to be processed by the flow cytometer comprises a beam collected from a micro-particle; and the fluorescent light signal comprises a fluorescence signal emitted from the micro-particle.

9. The light detecting system according to claim 1, further including:

an achromatic lens configured to collimate the beam to be processed by the flow cytometer and transmit the collimated beam to the beam separating device.

10. The light detecting system according to claim 1, further comprising a plurality of second aspheric lenses configured to focus a plurality of second beams, which are obtained by separating the respective first beam by a respective one of the plurality of wavelength division multiplexing devices, on the plurality of light detecting devices in the respective wavelength division multiplexing device.

11. The light detecting system according to claim 1, wherein each wavelength division multiplexing device comprises a wavelength division multiplexing unit including a plurality of mirrors, and a plurality of second bandpass filters disposed opposite the plurality of mirrors, each mirror is configured to reflect a beam transmitted to the mirror from a respective one of the plurality of second bandpass filters.

12. The light detecting system according to claim 11, wherein each mirror comprises a concave portion disposed between a pair of planar portions, and each concave portion is configured to reflect a beam transmitted to the concave portion from a corresponding one of the plurality of second bandpass filters, so as to collimate the beam.

13. The light detecting system according to claim 11, wherein each wavelength division multiplexing device further comprises a support base, the plurality of mirrors are disposed on a first surface of the support base, and the plurality of second bandpass filters are disposed on a second surface of the support base that is opposite and parallel to the first surface.

14. The light detecting system according to claim 1, wherein each wavelength division multiplexing devices comprises a wavelength division multiplexing unit including a plurality of planar mirrors and a plurality of concave mirrors alternatively disposed, and a plurality of second bandpass filters disposed opposite to the plurality of planar mirrors and the plurality of concave mirrors, each planar mirror is configured to reflect a beam transmitted to the planar mirror from a corresponding one of the plurality of second bandpass filters, and each concave mirror is configured to reflect a beam transmitted to the concave mirror from a corresponding one of the plurality of second bandpass filters, so as to collimate the beam.

15. The light detecting system according to claim 1, wherein the plurality of light detecting devices are arranged on a same plane.

* * * * *